US012601893B2

(12) United States Patent
Lee et al.

(10) Patent No.: US 12,601,893 B2
(45) Date of Patent: Apr. 14, 2026

(54) OPTICAL IMAGING SYSTEM

(71) Applicant: SAMSUNG ELECTRO-MECHANICS CO., LTD., Suwon-si (KR)

(72) Inventors: Ji Su Lee, Suwon-si (KR); Dong Hyuk Jang, Suwon-si (KR); Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 601 days.

(21) Appl. No.: 17/851,083

(22) Filed: Jun. 28, 2022

(65) Prior Publication Data

US 2023/0068322 A1      Mar. 2, 2023

(30) Foreign Application Priority Data

Aug. 4, 2021   (KR) ........................ 10-2021-0102449
Dec. 10, 2021   (KR) ........................ 10-2021-0176896

(51) Int. Cl.
*G02B 9/64* (2006.01)
*G02B 13/16* (2006.01)

(52) U.S. Cl.
CPC .............. *G02B 9/64* (2013.01); *G02B 13/16* (2013.01)

(58) Field of Classification Search
CPC ....... G02B 9/64; G02B 13/16; G02B 13/0045
See application file for complete search history.

(56) References Cited

U.S. PATENT DOCUMENTS

| | | | | |
|---|---|---|---|---|
| 9,835,822 B2 | 12/2017 | Huang | | |
| 2012/0147254 A1* | 6/2012 | Adachi | .................. | G02B 13/04 359/740 |
| 2017/0045714 A1 | 2/2017 | Huang | | |

(Continued)

FOREIGN PATENT DOCUMENTS

| | | |
|---|---|---|
| CN | 106443986 A | 2/2017 |
| CN | 107643586 A | 1/2018 |

(Continued)

OTHER PUBLICATIONS

Korean Office Action issued on May 8, 2024, in counterpart Korean Patent Application No. 10-2021-0176896 (8 pages in English, 6 pages in Korean).

(Continued)

*Primary Examiner* — Mariam Qureshi
(74) *Attorney, Agent, or Firm* — NSIP Law

(57) ABSTRACT
An optical imaging system is provided. The optical imaging system includes a first lens, a second lens, a third lens, a fourth lens, a fifth lens, a sixth lens, a seventh lens, and an eighth lens disposed in order from an object side to an imaging side. The first lens has positive refractive power, while the second lens has negative refractive power, and $TTL/(2 \times IMG\ HT) < 0.6$, $-0.2 < SAG52/TTL < 0$, and $10 < v1 - (v6+v7)/2 < 30$ are satisfied, where TTL is a distance from an object-side surface of the first lens to an imaging plane on an optical axis, IMG HT is equal to half a diagonal length of the imaging plane, SAG52 is a SAG value at an end of an effective aperture of an image-side surface of the fifth lens, v1 is an Abbe number of the first lens, v6 is an Abbe number of the sixth lens, and v7 is an Abbe number of the seventh lens.

15 Claims, 18 Drawing Sheets

100

(56)                References Cited

U.S. PATENT DOCUMENTS

| | | | |
|---|---|---|---|
| 2018/0180856 A1* | 6/2018 | Jung | G02B 13/0045 |
| 2019/0056568 A1* | 2/2019 | Huang | G02B 3/02 |
| 2019/0101729 A1 | 4/2019 | Hsieh et al. | |
| 2019/0204559 A1 | 7/2019 | Jhang et al. | |
| 2020/0174227 A1 | 6/2020 | Nitta | |
| 2020/0201002 A1 | 6/2020 | Xu et al. | |
| 2020/0249439 A1 | 8/2020 | Song et al. | |
| 2021/0055520 A1* | 2/2021 | Yan | G02B 13/0045 |
| 2021/0063697 A1 | 3/2021 | Li et al. | |
| 2021/0157092 A1 | 5/2021 | Chen et al. | |
| 2021/0157097 A1 | 5/2021 | Hirano | |
| 2021/0157098 A1 | 5/2021 | Hirano | |
| 2021/0173183 A1* | 6/2021 | Ye | G02B 9/64 |
| 2021/0181475 A1 | 6/2021 | Chen | |
| 2021/0223515 A1 | 7/2021 | Tseng et al. | |
| 2022/0244494 A1* | 8/2022 | Sun | G02B 13/0045 |

FOREIGN PATENT DOCUMENTS

| | | |
|---|---|---|
| CN | 107703609 A | 2/2018 |
| CN | 107741630 A | 2/2018 |
| CN | 207164344 U | 3/2018 |
| CN | 207424361 U | 5/2018 |
| CN | 108107545 A | 6/2018 |
| CN | 108254890 A | 7/2018 |
| CN | 110412749 A | 11/2019 |
| CN | 111736306 A | 10/2020 |
| CN | 113156626 A | 7/2021 |
| CN | 113204096 A | 8/2021 |
| JP | 6653111 B2 | 2/2020 |
| JP | 2021-33300 A | 3/2021 |
| KR | 10-2023-0010570 A | 1/2023 |
| TW | 201135279 A1 | 10/2011 |
| TW | 201706658 A | 2/2017 |
| TW | 202121000 A | 6/2021 |

OTHER PUBLICATIONS

Taiwanese Office Action issued on Jul. 4, 2023, in counterpart Taiwanese Patent Application No. 111123631 (4 pages in English, 3 pages in Chinese).

Chinese Office Action Issued on Mar. 1, 2024, in Counterpart Chinese Patent Application No. 202210936065.1 (4 Pages in English, 7 Pages in Chinese).

Taiwanese Office Action issued on Jan. 3, 2025 in corresponding Taiwanese Patent Application No. 113120741. (5 pages in English and 5 pages in Taiwanese).

* cited by examiner

300

400

500

OPTICAL IMAGING SYSTEM

CROSS-REFERENCE TO RELATED APPLICATIONS

This application claims the benefit under 35 USC 119(a) of Korean Patent Application Nos. 10-2021-0102449 filed on Aug. 4, 2021, and 10-2021-0176896 filed on Dec. 10, 2021, in the Korean Intellectual Property Office, the entire disclosures of which are incorporated herein by reference for all purposes.

BACKGROUND

1. Field

The following disclosure relates to an optical imaging system.

2. Description of Related Art

Portable terminals may include a camera including an optical imaging system with a plurality of lenses to perform operations such as, but not limited to, video calls and image capturing.

As operations that are performed by the camera included in the portable terminals have gradually increased, there has been an increasing demand for high resolution cameras for the portable terminals.

An image sensor having a high pixel count (for example, 13 million to 100 million pixels, or the like) may be employed in cameras incorporated in portable terminals to achieve improved picture quality.

Additionally, since portable terminals may be implemented to have a small size, the camera disposed in portable terminals may also be implemented to have a reduced size, and thus, it may be desirable to develop an optical imaging system which achieves high resolution while having a reduced size.

The above information is presented as background information only, to assist in gaining an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens, a second lens, a third lens, a fourth lens, a fifth lens, a sixth lens, a seventh lens, and an eighth lens disposed in order from an object side to an imaging side, wherein: the first lens is configured to have positive refractive power, and the second lens is configured to have negative refractive power; and TTL/(2×IMG HT)<0.6, −0.2<SAG52/TTL<0, and 10<v1−(v6+v7)/2<30 are satisfied, where TTL is a distance from an object-side surface of the first lens to an imaging plane on an optical axis, IMG HT is equal to half a diagonal length of the imaging plane, SAG52 is a SAG value at an end of an effective aperture of an image-side surface of the fifth lens, v1 is an Abbe number of the first lens, v6 is an Abbe number of the sixth lens, and v7 is an Abbe number of the seventh lens.

At least one of −0.2<SAG62/TTL<0, −0.3<SAG72/TTL<0, and −0.3<SAG82/TTL<0 may be satisfied, where SAG62 is a SAG value at an end of an effective aperture of an image-side surface of the sixth lens, SAG72 is a SAG value at an end of an effective aperture of an image-side surface of the seventh lens, and SAG82 is a SAG value at an end of an effective aperture of an image-side surface of the eighth lens.

At least one of 25<v1−v2<45 and 20<v1−v4<45 may be satisfied, where v1 is an Abbe number of the first lens, v2 is an Abbe number of the second lens, and v4 is an Abbe number of the fourth lens.

0<f1/f<1.4 may be satisfied, where f is a total focal length of the optical imaging system, and f1 is a focal length of the first lens.

−5<f2/f<−1 may be satisfied, where f is a total focal length of the optical imaging system, and f2 is a focal length of the second lens.

1<f3/f<7 may be satisfied, where f is a total focal length of the optical imaging system, and f3 is a focal length of the third lens.

0.3<|f4/f|10<15 may be satisfied, where f is a total focal length of the optical imaging system, and f4 is a focal length of the fourth lens.

0.2<|f5/f|/10<5 may be satisfied, where f is a total focal length of the optical imaging system, and f5 is a focal length of the fifth lens.

0.5<|f6/f|<7 may be satisfied, where f is a total focal length of the optical imaging system, and f6 is a focal length of the sixth lens.

0<(f7/f)/10<5 may be satisfied, where f is a total focal length of the optical imaging system, and f7 is a focal length of the seventh lens.

−3<f8/f<0 may be satisfied, where f is a total focal length of the optical imaging system, and f8 is a focal length of the eighth lens.

TTL/f<1.4 and BFL/f<0.3 may be satisfied, where f is a total focal length of the optical imaging system, and BFL is a distance from an image-side surface of the eighth lens to the imaging plane on the optical axis.

D1/f<0.1 may be satisfied, where D1 is a distance between an image-side surface of the first lens and an object-side surface of the second lens on the optical axis.

FOV×(IMG HT/f)>65° may be satisfied, where f is a total focal length of the optical imaging system, and FOV is a field of view of the optical imaging system.

The third lens may have positive refractive power, the fourth lens may have negative refractive power, the fifth lens may have positive refractive power, the sixth lens may have negative refractive power, the seventh lens may have positive refractive power, and the eighth lens may have negative refractive power.

The third lens may have positive refractive power, the fourth lens may have positive refractive power, the fifth lens may have negative refractive power, the sixth lens may have negative refractive power, the seventh lens may have positive refractive power, and the eighth lens may have negative refractive power.

The third lens may have positive refractive power, the fourth lens may have negative refractive power, the fifth lens may have negative refractive power, the sixth lens may have positive refractive power, the seventh lens may have positive refractive power, and the eighth lens may have negative refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
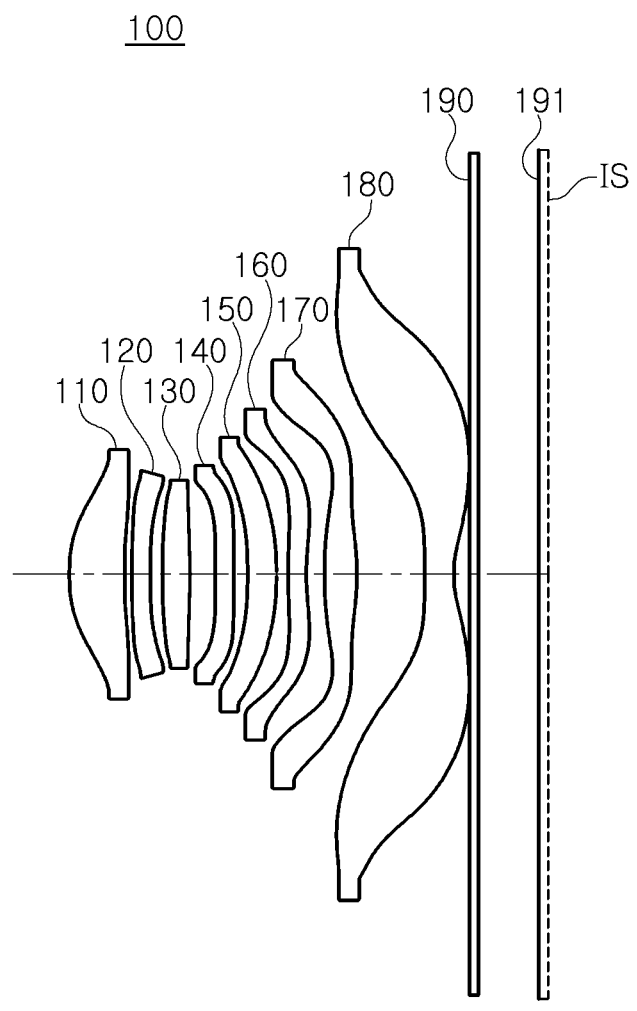
FIG. 1 is a diagram illustrating an example optical imaging system according to a first example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depictions of elements in the drawings may be exaggerated for clarity, illustration, and convenience.

Hereinafter, examples of the present disclosure will be described as follows with respect to the accompanying drawings.

An aspect of the one or more examples may provide an optical imaging system which may implement high resolution and may have a reduced total length.

In the lens diagrams, a thickness, a size, and a shape of the lens are exaggerated, and in particular, the shape of a spherical or aspherical surface presented in the lens diagram is merely an example and is not limited thereto.

A first lens refers to a lens most adjacent to an object side, and an eighth lens refers to a lens most adjacent to an imaging plane (or an image sensor).

A first surface of each lens refers to a surface adjacent to an object side (or an object-side surface), and a second surface of each lens refers to a surface adjacent to an image side (or an image-side surface). In the one or more examples, all numerical values of radii of curvature, thicknesses, distances, focal lengths, and the like, of lenses are indicated by millimeters (mm), and a field of view (FOV) is indicated by degrees.

In a description of a shape of each of the lenses, the disclosure that one surface of a lens is convex means that a paraxial region portion of a corresponding surface is convex, the disclosure that one surface of a lens is concave means that a paraxial region portion of a corresponding surface is concave, and the disclosure that one surface of a lens is planar means that a paraxial region portion of a corresponding surface is a plane. Therefore, even in the example that one surface of a lens is described as being convex, an edge portion or region of the lens may be concave. Similarly, even in the example that one surface of a lens is described as being concave, an edge portion or region of the lens may be convex. Additionally, even in the example that one surface of a lens is described as being a plane, an edge portion or region of the lens may be convex or concave.

A paraxial region refers to a significantly narrow region adjacent to an optical axis.

The imaging plane may refer to a virtual plane on which a focused image is formed by an optical imaging system. Alternatively, the imaging surface may refer to a surface of an image sensor on which light is received.

An optical imaging system in an example embodiment may include eight lenses.

In an example, the optical imaging system in an example embodiment may include a first lens, a second lens, a third lens, a fourth lens, a fifth lens, a sixth lens, a seventh lens, and an eighth lens arranged in order from an object side to an imaging side. The first to eighth lenses may be spaced apart from each other by a predetermined distance along an optical axis.

However, the optical imaging system in an example embodiment is not limited to only including eight lenses, but may further include other components, as necessary.

For example, the optical imaging system may further include an image sensor that converts an image of a subject incident thereon into an electrical signal.

Additionally, the optical imaging system may further include an infrared filter (hereinafter, referred to as a "filter") that blocks infrared light. The filter may be disposed between the eighth lens and the image sensor.

Additionally, the optical imaging system may further include a stop that adjusts an amount of light.

In a non-limited example, the first to eighth lenses, included in the example optical imaging system may be formed of a plastic material.

At least one of the first to eighth lenses may have an aspherical surface. Each of the first to eighth lenses may have at least one aspherical surface.

That is, at least one of the first and second surfaces of each of the first to eighth lenses may be an aspherical surface. The aspherical surface of each of the first to eighth lenses is represented, as follows:

$$Z = \frac{cY^2}{1 + \sqrt{1 - (1 + K)c^2 Y^2}} + AY^4 +$$
$$BY^6 + CY^8 + DY^{10} + EY^{12} + FY^{14} + GY^{16} +$$
$$HY^{18} + JY^{20} + LY^{22} + MY^{24} + NY^{26} + OY^{28} + PY^{30}$$

Equation 1

In Equation 1, c is a curvature of the lens (a reciprocal of the radius of curvature), K is a conic constant, and Y is a distance from one point on an aspherical surface of a lens to an optical axis. Additionally, constants A to P are aspheric coefficients, and Z(SAG) is a distance from one point on the aspherical surface of the lens to a vertex of the aspherical surface in an optical axis direction. SAG refers to either the convex or concave curvature, and represents the physical distance between the vertex (highest or lowest point) point along the curve and the center point of a line drawn perpendicular to the curve from one edge of the optic lens to the other.

The optical imaging system in an example embodiment may satisfy at least one of the conditional expressions, as follows:

| | |
|---|---|
| $0 < f1//f < 1.4$ | Conditional Expression 1: |
| $25 < v1 - v2 < 45$ | Conditional Expression 2: |
| $20 < v1 - v4 < 45$ | Conditional Expression 3: |
| $10 < v1 - (v6 + v7)/2 < 30$ | Conditional Expression 4: |
| $-5 < f2//f < -1$ | Conditional Expression 5: |
| $1 < f3//f < 7$ | Conditional Expression 6: |
| $0.3 < |f4//f|/10 < 15$ | Conditional Expression 7: |
| $0.2 < |f5//f|/10 < 5$ | Conditional Expression 8: |
| $0.5 < |f6//f| < 7$ | Conditional Expression 9: |
| $0 < (f7//f)/10 < 5$ | Conditional Expression 10: |
| $-3 < f8//f < 0$ | Conditional Expression 11: |
| $TTL//f < 1.4$ | Conditional Expression 12: |
| $f1//f2 < 0$ | Conditional Expression 13: |

$f1/f3>0$          Conditional Expression 14:

$BFL/f<0.3$          Conditional Expression 15:

$D1/f<0.1$          Conditional Expression 16:

$TTL/(2 \times IMG\ HT)<0.6$          Conditional Expression 17:

$FOV \times (IMG\ HT/f)>65°$          Conditional Expression 18:

$-0.2<SAG52/TTL<0$          Conditional Expression 19:

$-0.2<SAG62/TTL<0$          Conditional Expression 20:

$-0.3<SAG72/TTL<0$          Conditional Expression 21:

$-0.3<SAG82/TTL<0$          Conditional Expression 22:

In the conditional expressions, f is a total focal length of the optical imaging system, f1 is a focal length of the first lens, f2 is a focal length of the second lens, f3 is a focal length of the third lens, f4 is a focal length of the fourth lens distance, f5 is a focal length of the fifth lens, f6 is a focal length of the sixth lens, U is a focal length of the seventh lens, and f8 is a focal length of the eighth lens.

In the conditional expressions, v1 is an Abbe number of the first lens, v2 is an Abbe number of the second lens, v4 is an Abbe number of the fourth lens, v6 is an Abbe number of the sixth lens, and v7 is an Abbe number of the seventh lens.

In the conditional expressions, TTL is a distance from the object-side surface of the first lens to an imaging plane on the optical axis, and BFL is a distance from the image-side surface of the eighth lens to the imaging plane on the optical axis.

In the conditional expressions, D1 is a distance between the image-side surface of the first lens and the object-side surface of the second lens on the optical axis, IMG HT equal to half a diagonal length of the imaging plane, and FOV is a field of view of the optical imaging system.

In the conditional expressions, SAG52 is a SAG value at an end of an effective aperture of an object-side surface of the fifth lens, SAG62 is a SAG value at an end of an effective aperture of an object-side surface of the sixth lens, SAG72 is a SAG value at an end of an effective aperture of an object-side surface of the seventh lens, and SAG82 is a SAG value at an end of an effective aperture of an object-side surface of the eighth lens.

When a SAG value is negative, it means that an end of an effective aperture of a corresponding lens surface is disposed to be closer to an object side than a vertex of the corresponding lens surface.

When a SAG value is positive, it means that an end of an effective aperture of a corresponding lens surface is disposed to be closer to an image side than a vertex of the corresponding lens surface.

The first to eighth lenses, included in the optical imaging system in an example embodiment, will be described.

The first lens may have positive refractive power. Additionally, the first lens may have a meniscus shape of which an object-side surface is convex. Additionally, the first surface of the first lens may be convex, and the second surface of the first lens may be concave.

At least one of the first surface and the second surface of the first lens may be aspherical. In an example, both surfaces of the first lens may be aspherical.

The second lens may have negative refractive power. Additionally, the second lens may have a meniscus shape of which an object-side surface is convex. Additionally, the first surface of the second lens may be convex, and the second surface of the second lens may be concave.

At least one of the first surface of the second lens and the second surface of the second lens may be aspherical. In an example, both surfaces of the second lens may be aspherical.

The third lens may have positive refractive power. Additionally, the third lens may have a shape of which both surfaces may be convex. Additionally, the first surface of the third lens and the second surface of the third lens may be convex.

Alternatively, the third lens may have a meniscus shape of which an object-side surface is convex. Additionally, the first surface of the third lens may be convex, and the second surface of the third lens may be concave.

At least one of the first surface and the second surface of the third lens may be aspherical. In an example, both surfaces of the third lens may be aspherical.

The fourth lens may have positive or negative refractive power. Additionally, the fourth lens may have a meniscus shape of which an object-side surface is convex. Additionally, the first surface of the fourth lens may be convex, and the second surface of the fourth lens may be concave.

Alternatively, the fourth lens may have a meniscus shape of which an image-side surface is convex. Additionally, the first surface of the fourth lens may be concave, and second surface of the fourth lens may be convex.

At least one of the first surface and the second surface of the fourth lens may be aspherical. In an example, both surfaces of the fourth lens may be aspherical.

The fifth lens may have positive or negative refractive power. Also, the fifth lens may have a meniscus shape of which an image-side surface is convex. Additionally, the first surface of the fifth lens may be concave, and the second surface of the fifth lens may be convex.

Alternatively, the fifth lens may have a meniscus shape of which an object-side surface is convex. Additionally, the first surface of the fifth lens may be convex in a paraxial region, and the second surface of the fifth lens may be concave in the paraxial region.

At least one of the first surface and the second surface of the fifth lens may be aspherical. In an example, both surfaces of the fifth lens may be aspherical.

The sixth lens may have positive or negative refractive power. Additionally, the sixth lens may have a meniscus shape of which an object-side surface is convex. Additionally, the first surface of the sixth lens may be convex in a paraxial region, and the second surface of the sixth lens may be concave in the paraxial region.

The sixth lens may have a shape of which both sides may be convex. Additionally, the first surface and the second surface of the sixth lens may be convex in a paraxial region.

At least one of the first surface and the second surface of the sixth lens may be aspherical. In an example, both surfaces of the sixth lens may be aspherical.

At least one inflection point may be formed on at least one of the first surface and the second surface of the sixth lens. In an example, the first surface of the sixth lens may be convex in the paraxial region and concave in a portion other than the paraxial region. The second surface of the sixth lens may be concave in the paraxial region and convex in a portion other than the paraxial region.

The seventh lens may have positive refractive power. Additionally, the seventh lens may have a shape of which both surfaces may be convex. Additionally, the first surface and the second surface of the seventh lens may be convex.

Alternatively, the seventh lens may have a meniscus shape of which an image-side surface is convex. Additionally, the first surface of the seventh lens may be concave in a paraxial region, and the second surface of the seventh lens may be convex in the paraxial region.

At least one of the first surface and the second surface of the seventh lens may be aspherical. In an example, both surfaces of the seventh lens may be aspherical.

Additionally, at least one inflection point may be formed on at least one of the first surface and the second surface of the seventh lens. In an example, the first surface of the seventh lens may be convex in the paraxial region and concave in a portion or region other than the paraxial region. The second surface of the seventh lens may be convex in the paraxial region and concave in a portion or region other than the paraxial region.

The eighth lens may have negative refractive power. Additionally, the eighth lens may have a meniscus shape of which an object-side surface is convex. Additionally, the first surface of the eighth lens may be convex in a paraxial An example optical imaging system 100 in the first example embodiment may include an optical system including a first lens 110, a second lens 120, a third lens 130, a fourth lens 140, a fifth lens 150, a sixth lens 160, a seventh lens 170, and an eighth lens 180, and may further include a filter 190 and an image sensor IS.

The example optical imaging system 100 in the first example embodiment may form a focused image on an imaging plane 191. The imaging plane 191 may refer to a surface on which a focused image is formed by an optical imaging system. As an example, the imaging plane 191 may refer to one surface of the image sensor IS on which light is received.

The lens properties (a radius of curvature, a thickness of the lens or a distance between the lenses, a refractive index, an Abbe number, and a focal length) of each lens are listed in Table 1 below.

TABLE 1

| Surface No. | Note | Radius of Curvature | Thickness or Distance | Refractive Index | Abbe Number | Focal Length |
|---|---|---|---|---|---|---|
| S1 | First Lens | 1.982 | 0.650 | 1.544 | 56.0 | 5.03 |
| S2 | | 6.307 | 0.095 | | | |
| S3 | Second Lens | 11.141 | 0.210 | 1.680 | 18.2 | −14.95 |
| S4 | | 5.311 | 0.139 | | | |
| S5 | Third Lens | 7.974 | 0.317 | 1.535 | 55.7 | 13.77 |
| S6 | | −100.413 | 0.300 | | | |
| S7 | Fourth Lens | 56.690 | 0.219 | 1.680 | 18.2 | −54.28 |
| S8 | | 22.501 | 0.167 | | | |
| S9 | Fifth Lens | −4.290 | 0.340 | 1.535 | 55.7 | 47.16 |
| S10 | | −3.770 | 0.137 | | | |
| S11 | Sixth Lens | 7.407 | 0.210 | 1.614 | 25.9 | −11.4 |
| S12 | | 3.577 | 0.209 | | | |
| S13 | Seventh Lens | 6.279 | 0.378 | 1.567 | 37.4 | 3.91 |
| S14 | | −3.380 | 0.789 | | | |
| S15 | Eighth Lens | 27.470 | 0.350 | 1.535 | 55.7 | −3.24 |
| S16 | | 1.631 | 0.180 | | | |
| S17 | Filter | Infinity | 0.110 | 1.517 | 64.2 | |
| S18 | | Infinity | 0.700 | | | |
| S19 | Imaging Plane | Infinity | | | | | region, and the second surface of the eighth lens may be concave in the paraxial region.

At least one of the first surface and the second surface of the eighth lens may be aspherical. In an example, both surfaces of the eighth lens may be aspherical.

Additionally, at least one inflection point may be formed on at least one of the first surface and the second surface of the eighth lens. In an example, the first surface of the eighth lens may be convex in the paraxial region and concave in a portion other than the paraxial region. The second surface of the eighth lens may be concave in the paraxial region and convex in a portion or region other than the paraxial region.

Each of the first to eighth lenses may be formed of a plastic material having optical properties different from optical properties of an adjacent lens.

Among the first to eighth lenses, at least three lenses may have a refractive index greater than 1.61. As an example, the refractive index of each of the second lens, the fourth lens, and the sixth lens may be greater than 1.61. Alternatively, the refractive index of each of the second lens, the fourth lens, and the seventh lens may be greater than 1.61.

An optical imaging system according to a first example embodiment will be described with reference to FIGS. 1 and 2.

In the example optical imaging system in the first example embodiment, a total focal length f may be 4.53 mm, IMG HT may be 5.107 mm, FOV may be 940, SAG52 may be −0.4555 mm, SAG62 may be −0.4884 mm, SAG72 may be −0.7403 mm, and SAG82 may be −1.1111 mm.

In the first example embodiment, the first lens 110 may have positive refractive power, a first surface of the first lens 110 may be convex, and a second surface of the first lens 110 may be concave.

The second lens 120 may have negative refractive power, the first surface of the second lens 120 may be convex, and the second surface of the second lens 120 may be concave.

The third lens 130 may have positive refractive power, and the first surface of the third lens 130 may be convex and the second surface of the third lens 130 may be convex.

The fourth lens 140 may have negative refractive power, the first surface of the fourth lens 140 may be convex, and the second surface of the fourth lens 140 may be concave.

The fifth lens 150 may have positive refractive power, the first surface of the fifth lens 150 may be concave, and the second surface of the fifth lens 150 may be convex.

The sixth lens 160 may have negative refractive power, the first surface of the sixth lens 160 may be convex in a paraxial region, and the second surface of the sixth lens 160 may be concave in the paraxial region.

At least one inflection point may be formed on at least one of the first surface and the second surface of the sixth lens 160. In an example, the first surface of the sixth lens 160 may be convex in the paraxial region and concave in a portion or region other than the paraxial region. The second surface of the sixth lens 160 may be concave in the paraxial region and convex in a portion or region other than the paraxial region.

The seventh lens 170 may have positive refractive power, and the first surface of the seventh lens 170 may be convex in a paraxial region, and the second surface of the seventh lens 170 may be convex in a paraxial region.

At least one inflection point may be formed on at least one of the first surface and the second surface of the seventh lens 170. In an example, the first surface of the seventh lens 170 may be convex in the paraxial region and concave in a portion or region other than the paraxial region. The second surface of the seventh lens 170 may be convex in the paraxial region and concave in a portion or region other than the paraxial region.

The eighth lens 180 may have negative refractive power, the first surface of the eighth lens 180 may be convex in a paraxial region, and the second surface of the eighth lens 180 may be concave in the paraxial region.

At least one inflection point may be formed on at least one of the first and second surfaces of the eighth lens 180. In an example, the first surface of the eighth lens 180 may be convex in the paraxial region and concave in a portion or region other than the paraxial region. The second surface of the eighth lens 180 may be concave in the paraxial region and convex in a portion or region other than the paraxial region.

Each surface of the first lens 110 to the eighth lens 180 may have an aspherical coefficient, as illustrated in Table 2 below. In an example, both the object-side surfaces and the image-side surfaces of the first lens 110 to the eighth lens 180 may be aspherical.

TABLE 2

| Surface No. | S1 | S2 | S3 | S4 | S5 | S6 | S7 | S8 |
|---|---|---|---|---|---|---|---|---|
| Conic Coefficient (K) | −2.224 | −54.519 | 31.908 | 13.587 | 1.116 | −73.834 | 87.994 | −30.333 |
| 4th Coefficient (A) | 9.129E−03 | −2.512E−02 | −3.988E−02 | −3.782E−02 | −1.044E−02 | −8.318E−03 | −1.079E−01 | −2.655E−02 |
| 6th Coefficient (B) | 1.988E−01 | 1.612E−01 | −7.842E−02 | 2.773E−01 | −1.957E−02 | −1.487E−01 | 3.544E−01 | −4.507E−01 |
| 8th Coefficient (C) | −1.165E+00 | −1.233E+00 | 1.457E+00 | −2.839E+00 | −1.106E−01 | 1.116E+00 | −3.178E+00 | 3.511E+00 |
| 10th Coefficient (D) | 4.310E+00 | 5.871E+00 | −9.290E+00 | 1.863E+01 | 4.373E+00 | −4.808E+00 | 1.601E+01 | −1.890E+01 |
| 12th Coefficient (E) | −1.086E+01 | −1.858E+01 | 3.765E+01 | −7.420E+01 | −4.047E+01 | 1.192E+01 | −5.211E+01 | 6.831E+01 |
| 14th Coefficient (F) | 1.926E+01 | 4.085E+01 | −1.039E+02 | 1.866E+02 | 2.040E+02 | −1.612E+01 | 1.105E+02 | −1.711E+02 |
| 16th Coefficient (G) | −2.456E+01 | −6.417E+01 | 2.012E+02 | −2.963E+02 | −6.529E+02 | 9.569E+00 | −1.440E+02 | 3.040E+02 |
| 18th Coefficient (H) | 2.276E+01 | 7.292E+01 | −2.773E+02 | 2.721E+02 | 1.408E+03 | −3.987E+00 | 8.302E+01 | −3.890E+02 |
| 20th Coefficient (J) | −1.532E+01 | −6.004E+01 | 2.733E+02 | −7.592E+01 | −2.099E+03 | 2.389E+01 | 6.405E+01 | 3.595E+02 |
| 22nd Coefficient (L) | 7.399E+00 | 3.544E+01 | −1.909E+02 | −1.333E+02 | 2.170E+03 | −6.011E+01 | −1.802E+02 | −2.378E+02 |
| 24th Coefficient (M) | −2.498E+00 | −1.461E+01 | 9.219E+01 | 1.876E+02 | −1.528E+03 | 7.084E+01 | 1.756E+02 | 1.096E+02 |
| 26th Coefficient (N) | 5.591E−01 | 3.991E+00 | −2.924E+01 | −1.126E+02 | 6.995E+02 | −4.542E+01 | −9.410E+01 | −3.347E+01 |
| 28th Coefficient (O) | −7.447E−02 | −6.489E−01 | 5.475E+00 | 3.456E+01 | −1.878E+02 | 1.545E+01 | 2.748E+01 | 6.076E+00 |
| 30th Coefficient (P) | 4.468E−03 | 4.751E−02 | −4.582E−01 | −4.418E+00 | 2.245E+01 | −2.200E+00 | −3.435E+00 | −4.960E−01 |

| Surface No. | S9 | S10 | S11 | S12 | S13 | S14 | S15 | S16 |
|---|---|---|---|---|---|---|---|---|
| Conic Coefficient (K) | 3.009 | 0.639 | −14.303 | −0.896 | 5.299 | −18.381 | −0.183 | −5.534 |
| 4th Coefficient (A) | 4.110E−02 | −2.595E−03 | −1.762E−01 | −1.982E−01 | 1.248E−01 | 1.113E−01 | −2.111E−01 | −1.425E−01 |
| 6th Coefficient (B) | −2.210E−01 | 1.328E−01 | 3.095E−01 | 4.530E−02 | −4.244E−01 | −1.313E−01 | 7.959E−02 | 8.384E−02 |
| 8th Coefficient(C) | 1.175E+00 | −2.976E−01 | −1.421E−01 | 3.507E−01 | 8.020E−01 | 1.107E−01 | 5.821E−03 | −3.283E−02 |
| 10th Coefficient (D) | −5.655E+00 | −9.807E−01 | −1.488E+00 | −1.182E+00 | −1.113E+00 | −3.772E−03 | −2.221E−02 | 8.306E−03 |
| 12th Coefficient (E) | 1.865E+01 | 5.512E+00 | 5.036E+00 | 2.119E+00 | 1.164E+00 | −9.829E−02 | 1.269E−02 | −1.182E−03 |
| 14th Coefficient (F) | −4.154E+01 | −1.223E+01 | −8.795E+00 | −2.529E+00 | −9.297E−01 | 1.096E−01 | −4.146E−03 | 2.096E−05 |
| 16th Coefficient (G) | 6.455E+01 | 1.657E+01 | 9.974E+00 | 2.124E+00 | 5.598E−01 | −6.517E−02 | 8.935E−04 | 2.641E−05 |
| 18th Coefficient (H) | −7.165E+01 | −1.517E+01 | −7.828E+00 | −1.275E+00 | −2.499E−01 | 2.504E−02 | −1.334E−04 | −5.408E−06 |
| 20th Coefficient (J) | 5.734E+01 | 9.728E+00 | 4.336E+00 | 5.472E−01 | 8.136E−02 | −6.577E−03 | 1.404E−05 | 5.332E−07 |

TABLE 2-continued

| | | | | | | | | |
|---|---|---|---|---|---|---|---|---|
| 22nd Coefficient (L) | −3.287E+01 | −4.386E+00 | −1.691E+00 | −1.660E−01 | −1.892E−02 | 1.196E−03 | −1.041E−06 | −2.742E−08 |
| 24th Coefficient (M) | 1.318E+01 | 1.365E+00 | 4.541E−01 | 3.468E−02 | 3.048E−03 | −1.484E−04 | 5.334E−08 | 4.357E−10 |
| 26th Coefficient (N) | −3.504E+00 | −2.797E−01 | −7.982E−02 | −4.734E−03 | −3.222E−04 | 1.200E−05 | −1.797E−09 | 2.654E−11 |
| 28th Coefficient (O) | 5.547E−01 | 3.390E−02 | 8.259E−03 | 3.798E−04 | 2.007E−05 | −5.703E−07 | 3.583E−11 | −1.475E−12 |
| 30th Coefficient (P) | −3.953E−02 | −1.843E−03 | −3.810E−04 | −1.357E−05 | −5.582E−07 | 1.209E−08 | −3.206E−13 | 2.245E−14 |

Figure 2:
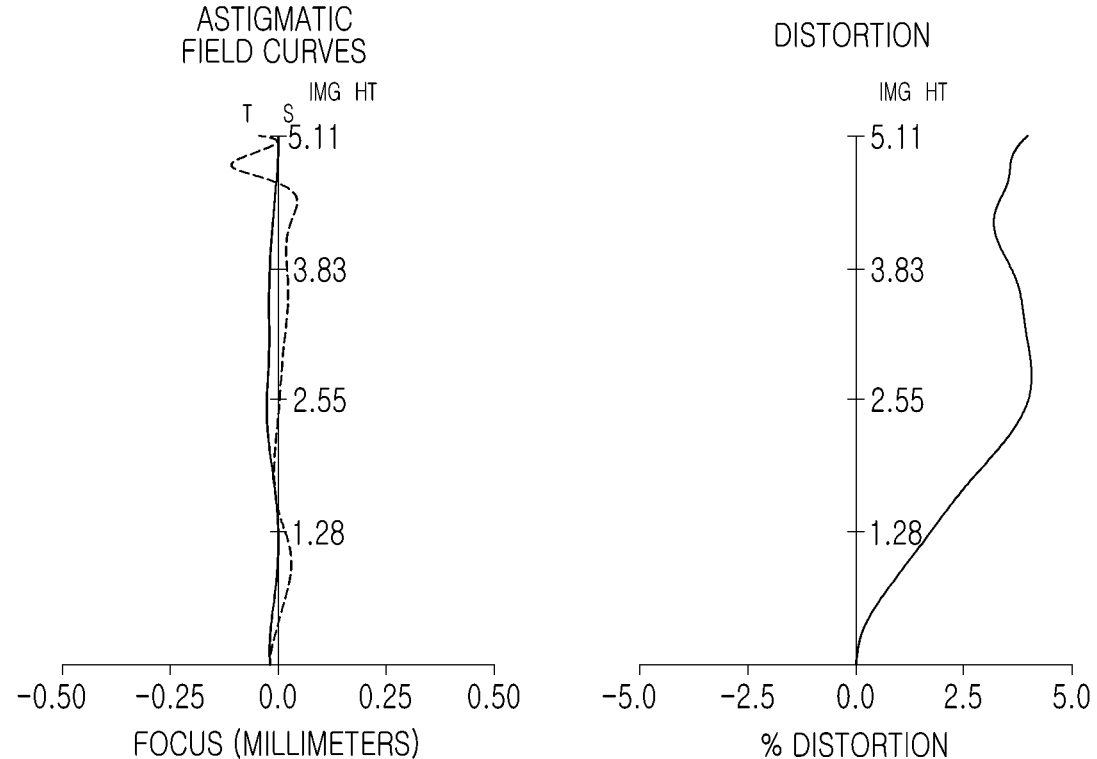
FIG. 2 is a diagram illustrating aberration properties of the example optical imaging system illustrated in FIG. 1.

The above-configured optical imaging system may have aberration properties illustrated in FIG. 2.

Figure 3:
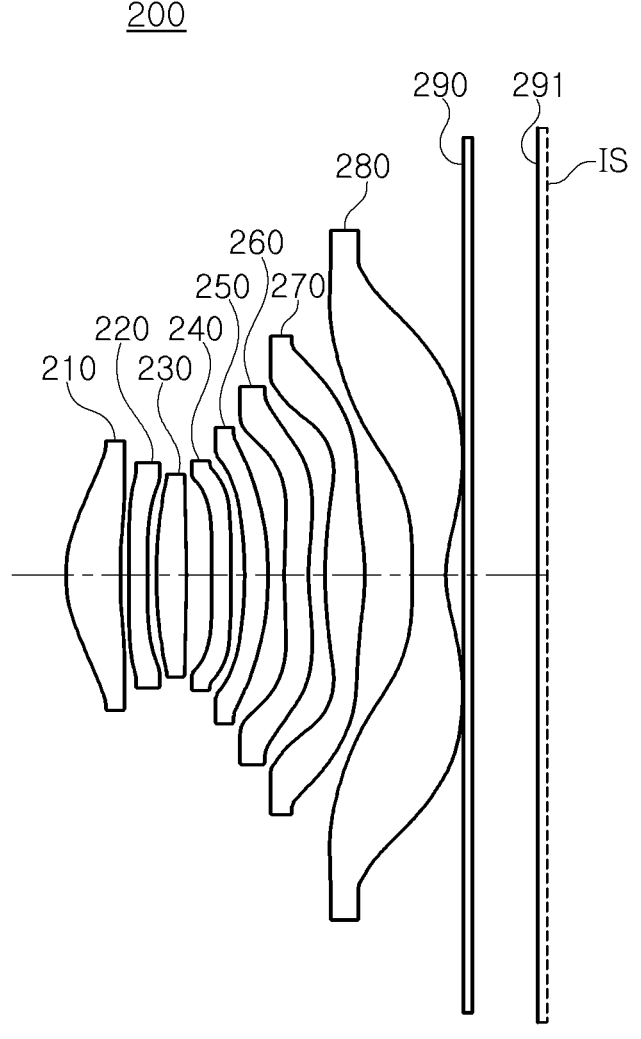
FIG. 3 is a diagram illustrating an example optical imaging system according to a second example embodiment.

An example optical imaging system according to a second example embodiment will be described with reference to FIGS. 3 and 4.

An example optical imaging system 200 in the second example embodiment may include an optical system including a first lens 210, a second lens 220, a third lens 230, a fourth lens 240, a fifth lens 250, a sixth lens 260, a seventh lens 270, and an eighth lens 280, and may further include a filter 290 and an image sensor IS.

The example optical imaging system 200 in the second example embodiment may form a focused image on an imaging plane 291. The imaging plane 291 may refer to a surface on which a focused image is formed by an optical imaging system. In an example, the imaging plane 291 may refer to one surface of the image sensor IS on which light is received.

The lens properties (a radius of curvature, a thickness of the lens or a distance between the lenses, a refractive index, an Abbe number, and a focal length) of each lens are listed in Table 3 below.

The second lens 220 may have negative refractive power, the first surface of the second lens 220 may be convex, and the second surface of the second lens 220 may be concave.

The third lens 230 may have positive refractive power, the first surface of the third lens 230 may be convex, and the second surface of the third lens 230 may be concave.

The fourth lens 240 may have negative refractive power, the first surface of the fourth lens 240 may be convex, and the second surface of the fourth lens 240 may be concave.

The fifth lens 250 may have positive refractive power, the first surface of the fifth lens 250 may be concave, and the second surface of the fifth lens 250 may be convex.

The sixth lens 260 may have negative refractive power, the first surface of the sixth lens 260 may be convex in a paraxial region, and a second surface of the sixth lens 260 may be concave in the paraxial region.

At least one inflection point may be formed on at least one of the first surface and the second surface of the sixth lens 260. In an example, the first surface of the sixth lens 260 may be convex in the paraxial region and concave in a portion or region other than the paraxial region. The second

TABLE 3

| Surface No. | Note | Radius of Curvature | Thickness or Distance | Refractive Index | Abbe Number | Focal Length |
|---|---|---|---|---|---|---|
| S1 | First Lens | 1.998 | 0.631 | 1.544 | 56.0 | 5.12 |
| S2 | | 6.204 | 0.093 | | | |
| S3 | Second Lens | 10.740 | 0.210 | 1.680 | 18.2 | −14.38 |
| S4 | | 5.113 | 0.116 | | | |
| S5 | Third Lens | 6.315 | 0.342 | 1.535 | 55.7 | 12.09 |
| S6 | | 225.509 | 0.313 | | | |
| S7 | Fourth Lens | 70.236 | 0.212 | 1.680 | 18.2 | −96.35 |
| S8 | | 34.089 | 0.161 | | | |
| S9 | Fifth Lens | −4.693 | 0.275 | 1.535 | 55.7 | 64.78 |
| S10 | | −4.220 | 0.199 | | | |
| S11 | Sixth Lens | 7.304 | 0.280 | 1.614 | 25.9 | −10.84 |
| S12 | | 3.448 | 0.193 | | | |
| S13 | Seventh Lens | 6.346 | 0.460 | 1.567 | 37.4 | 3.61 |
| S14 | | −2.968 | 0.555 | | | |
| S15 | Eighth Lens | 21.615 | 0.400 | 1.535 | 55.7 | −3.04 |
| S16 | | 1.506 | 0.200 | | | |
| S17 | Filter | Infinity | 0.110 | 1.517 | 64.2 | |
| S18 | | Infinity | 0.750 | | | |
| S19 | Imaging Plane | Infinity | | | | |

In the example optical imaging system 200 in the second example embodiment, a total focal length may be 4.53 mm, IMG HT may be 5.107 mm, FOV may be 94°, SAG52 may be −0.4005 mm, and SAG62 may be −0.5198 mm, SAG72 may be −0.83 mm, and SAG82 may be −1.03 mm.

In the second example embodiment, the first lens 210 may have positive refractive power, the first surface of the first lens 210 may be convex, and the second surface of the first lens 210 may be concave.

surface of the sixth lens 260 may be concave in the paraxial region and convex in a portion or region other than the paraxial region.

The seventh lens 270 may have positive refractive power, and the first surface of the seventh lens 270 may be convex in a paraxial region, and the second surface of the seventh lens 270 may be convex in a paraxial region.

At least one inflection point may be formed on at least one of the first surface and the second surface of the seventh lens 270. In an example, the first surface of the seventh lens 270 may be convex in the paraxial region and concave in a portion or region other than the paraxial region. The second surface of the seventh lens 270 may be convex in the paraxial region and concave in a portion or region other than the paraxial region.

The eighth lens 280 may have negative refractive power, the first surface of the eighth lens 280 may be convex in a paraxial region, and the second surface of the eighth lens 280 may be concave in the paraxial region.

At least one inflection point may be formed on at least one of the first and second surfaces of the eighth lens 280. In an example, the first surface of the eighth lens 280 may be convex in the paraxial region and concave in a portion or region other than the paraxial region. The second surface of the eighth lens 280 may be concave in the paraxial region and convex in a portion or region other than the paraxial region.

Each surface of the first lens 210 to the eighth lens 280 may have an aspherical coefficient, as illustrated in Table 4 below. In an example, both the object-side surfaces and the image-side surfaces of the first lens 210 to the eighth lens 280 may be aspherical.

TABLE 4

| Surface No. | S1 | S2 | S3 | S4 | S5 | S6 | S7 | S8 |
|---|---|---|---|---|---|---|---|---|
| Conic Coefficient (K) | −2.556 | −57.999 | 33.623 | 12.629 | 3.440 | 99.000 | 99.000 | 99.000 |
| 4th Coefficient (A) | 1.232E−02 | 3.438E−02 | −6.107E−02 | −4.693E−02 | −1.455E−02 | −1.715E−02 | −1.065E−01 | −4.761E−02 |
| 6th Coefficient (B) | 1.787E−01 | 2.984E−01 | 4.082E−01 | 6.437E−01 | −1.108E−02 | −8.236E−03 | 1.062E−01 | −3.962E−01 |
| 8th Coefficient (C) | −1.081E+00 | −2.120E+00 | −3.043E+00 | −7.860E+00 | −1.981E−02 | −4.037E−01 | 2.340E−01 | 3.935E+00 |
| 10th Coefficient (D) | 4.078E+00 | 9.286E+00 | 1.495E+01 | 5.639E+01 | 2.569E+00 | 6.116E+00 | −8.022E+00 | −2.287E+01 |
| 12th Coefficient (E) | −1.044E+01 | −2.744E+01 | −4.722E+01 | −2.564E+02 | −2.546E+01 | −4.208E+01 | 5.274E+01 | 8.350E+01 |
| 14th Coefficient (F) | 1.873E+01 | 5.716E+01 | 1.000E+02 | 7.899E+02 | 1.296E+02 | 1.722E+02 | −1.971E+02 | −2.061E+02 |
| 16th Coefficient (G) | −2.405E+01 | −8.594E+01 | −1.456E+02 | −1.714E+03 | −4.103E+02 | −4.624E+02 | 4.879E+02 | 3.578E+02 |
| 18th Coefficient (H) | 2.236E+01 | 9.423E+01 | 1.464E+02 | 2.673E+03 | 8.663E+02 | 8.528E+02 | −8.450E+02 | −4.457E+02 |
| 20th Coefficient (J) | −1.506E+01 | −7.532E+01 | −9.974E+01 | −3.011E+03 | −1.256E+03 | −1.101E+03 | 1.043E+03 | 4.004E+02 |
| 22nd Coefficient (L) | 7.271E+00 | 4.336E+01 | 4.345E+01 | 2.431E+03 | 1.257E+03 | 9.949E+02 | −9.164E+02 | −2.573E+02 |
| 24th Coefficient (M) | −2.451E+00 | −1.749E+01 | −1.012E+01 | −1.371E+03 | −8.536E+02 | −6.167E+02 | 5.598E+02 | 1.153E+02 |
| 26th Coefficient (N) | 5.470E−01 | 4.686E+00 | 2.012E−01 | 5.134E+02 | 3.761E+02 | 2.498E+02 | −2.261E+02 | −3.419E+01 |
| 28th Coefficient (O) | −7.263E−02 | −7.486E−01 | 4.649E−01 | −1.146E+02 | −9.697E+01 | −5.956E+01 | 5.432E+01 | 6.021E+00 |
| 30th Coefficient (P) | 4.340E−03 | 5.393E−02 | −7.723E−02 | 1.154E+01 | 1.111E+01 | 6.337E+00 | −5.876E+00 | −4.763E−01 |

| Surface No. | S9 | S10 | S11 | S12 | S13 | S14 | S15 | S16 |
|---|---|---|---|---|---|---|---|---|
| Conic Coefficient (K) | 3.950 | 0.112 | −5.046 | −2.003 | 5.209 | −16.889 | 3.161 | −5.946 |
| 4th Coefficient (A) | 3.432E−02 | −2.548E−02 | −1.497E−01 | −1.623E−01 | 1.034E−01 | 9.481E−02 | −1.839E−01 | −1.123E−01 |
| 6th Coefficient (B) | −2.858E−01 | 2.014E−01 | 2.275E−01 | 9.196E−02 | −3.329E−01 | −1.037E−01 | 3.701E−02 | 4.659E−02 |
| 8th Coefficient (C) | 2.649E+00 | −4.613E−01 | −3.127E−02 | −1.190E−03 | 6.086E−01 | 6.635E−02 | 4.151E−02 | −3.320E−03 |
| 10th Coefficient (D) | −1.411E+01 | −3.838E−01 | −1.369E+00 | −1.877E−01 | 8.442E−01 | 2.632E−02 | −4.340E−02 | −8.201E−03 |
| 12th Coefficient (E) | 4.560E+01 | 3.643E+00 | 4.249E+00 | 3.737E−01 | 8.870E−01 | −8.976E−02 | 2.190E−02 | 5.389E−03 |
| 14th Coefficient (F) | −9.792E+01 | −8.298E+00 | −7.138E+00 | −4.282E−01 | −7.047E−01 | 8.127E−02 | −7.025E−03 | −1.854E−03 |
| 16th Coefficient (G) | 1.469E+02 | 1.101E+01 | 7.858E+00 | 3.324E−01 | 4.169E−01 | −4.273E−02 | 1.537E−03 | −4.128E−04 |
| 18th Coefficient (H) | −1.581E+02 | −9.737E+00 | −5.999E+00 | −1.815E−01 | −1.812E−01 | 1.486E−02 | 2.364E−04 | 6.303E−05 |
| 20th Coefficient(J) | 1.229E+02 | 5.995E+00 | 3.235E+00 | 7.012E−02 | 5.700E−02 | −3.567E−03 | 2.586E−05 | 6.726E−06 |
| 22nd Coefficient (L) | −6.860E+01 | −2.591E+00 | −1.228E+00 | −1.897E−02 | −1.275E−02 | 5.947E−04 | −2.002E−06 | −5.006E−07 |
| 24th Coefficient (M) | 2.683E+01 | 7.729E−01 | 3.207E−01 | 3.501E−03 | 1.971E−03 | −6.773E−05 | 1.074E−07 | 2.542E−08 |
| 26th Coefficient (N) | −6.978E+00 | −1.518E−01 | −5.481E−02 | −4.191E−04 | −1.994E−04 | 5.028E−06 | −3.801E−09 | −8.384E−10 |

TABLE 4-continued

| | | | | | | | | |
|---|---|---|---|---|---|---|---|---|
| 28th Coefficient (O) | 1.084E+00 | 1.768E−02 | 5.511E−03 | 2.929E−05 | 1.188E−05 | −2.193E−07 | 7.982E−11 | 1.615E−11 |
| 30th Coefficient (P) | −7.606E−02 | −9.234E−04 | −2.468E−04 | −9.064E−07 | −3.153E−07 | 4.251E−09 | −7.536E−13 | −1.375E−13 |

Figure 4:
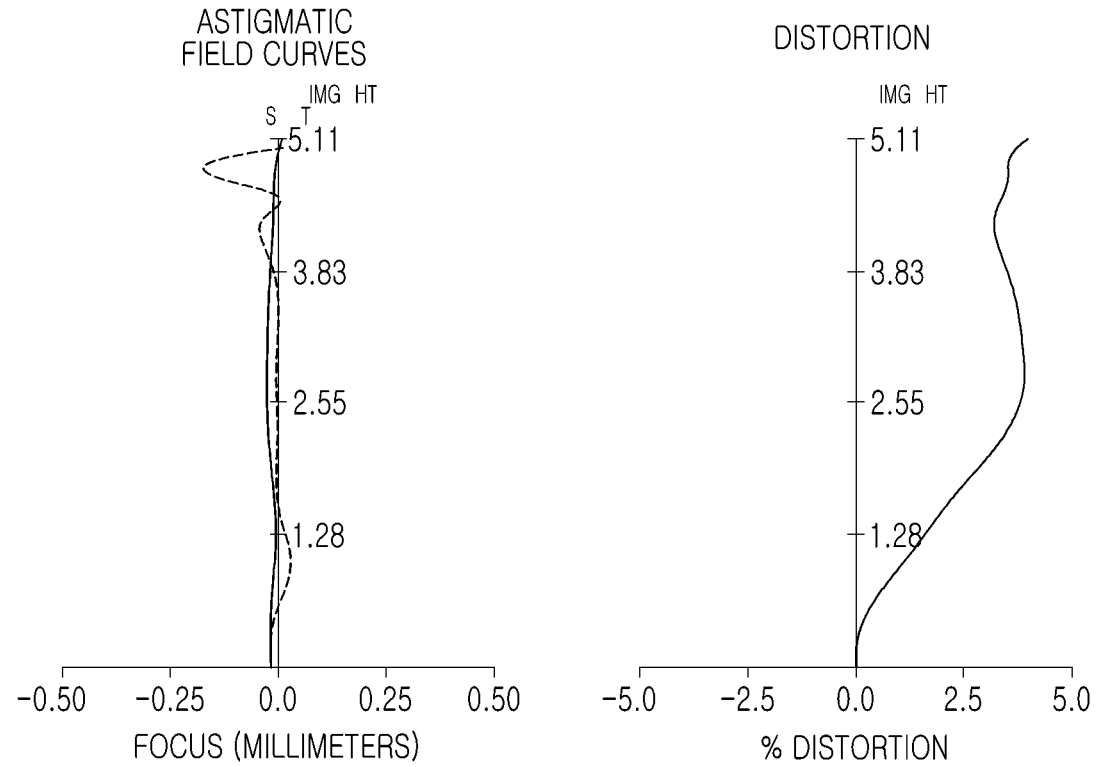
FIG. 4 is a diagram illustrating aberration properties of the example optical imaging system illustrated in FIG. 3.

The above-configured optical imaging system may have aberration properties illustrated in FIG. 4.

Figure 5:
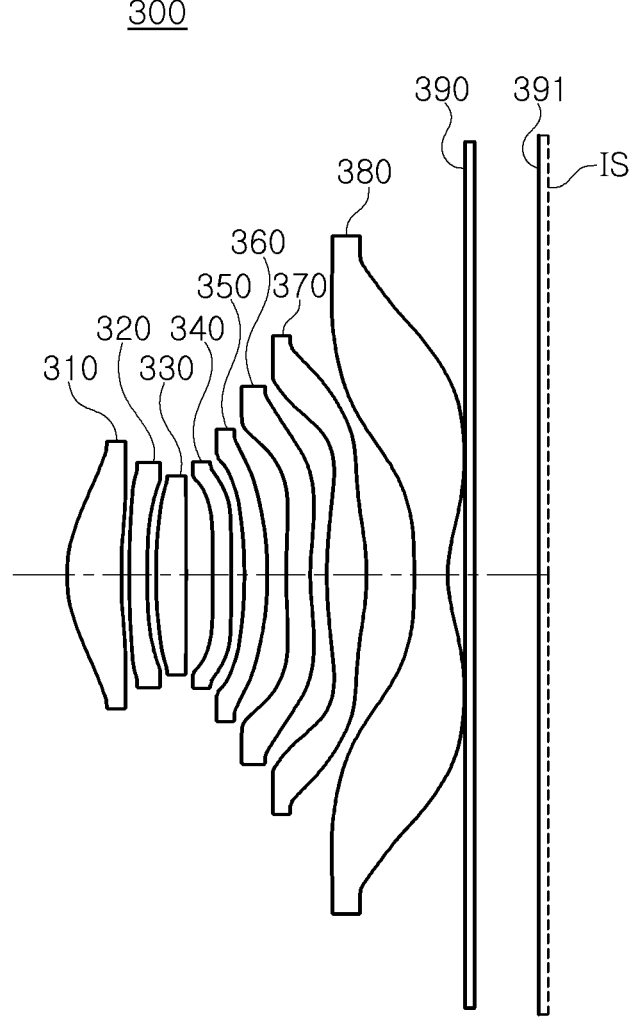
FIG. 5 is a diagram illustrating an example optical imaging system according to a third example embodiment.

An example optical imaging system in a third example embodiment will be described with reference to FIGS. 5 and 6.

An example optical imaging system 300 in the third example embodiment may include an optical system including a first lens 310, a second lens 320, a third lens 330, a fourth lens 340, a fifth lens 350, a sixth lens 360, a seventh lens 370, and an eighth lens 380, and may further include a filter 390 and an image sensor IS.

The example optical imaging system 300 in the third example embodiment may form a focused image on an imaging plane 391. The imaging plane 391 may refer to a surface on which a focused image is formed by an optical imaging system. In an example, the imaging plane 391 may refer to one surface of the image sensor IS on which light is received.

The lens properties (a radius of curvature, a thickness of the lens or a distance between the lenses, a refractive index, an Abbe number, and a focal length) of each lens are listed in Table 5 below.

The fourth lens 340 may have negative refractive power, the first surface of the fourth lens 340 may be convex, and the second surface of the fourth lens 340 may be concave.

The fifth lens 350 may have positive refractive power, the first surface of the fifth lens 350 may be concave, and the second surface of the fifth lens 350 may be convex.

The sixth lens 360 may have negative refractive power, the first surface of the sixth lens 360 may be convex, and the second surface of the sixth lens 360 may be concave in the paraxial region.

At least one inflection point may be formed on at least one of the first surface of the sixth lens 360 and the second surface of the sixth lens 360. In an example, the first surface of the sixth lens 360 may be convex in a paraxial region and concave in a portion or region other than the paraxial region. The second surface of the sixth lens 360 may be concave in the paraxial region and convex in a portion or region other than the paraxial region.

The seventh lens 370 may have positive refractive power, and the first surface of the seventh lens 370 may be convex in the paraxial region and the second surface of the seventh lens 370 may be convex in the paraxial region.

TABLE 5

| Surface No. | Note | Radius of Curvature | Thickness or Distance | Refractive Index | Abbe Number | Focal Length |
|---|---|---|---|---|---|---|
| S1 | First Lens | 2.018 | 0.623 | 1.544 | 56.0 | 5.17 |
| S2 | | 6.295 | 0.093 | | | |
| S3 | Second Lens | 10.840 | 0.210 | 1.680 | 18.2 | −14.18 |
| S4 | | 5.098 | 0.106 | | | |
| S5 | Third Lens | 6.020 | 0.349 | 1.535 | 55.7 | 12.25 |
| S6 | | 69.248 | 0.316 | | | |
| S7 | Fourth Lens | 53.789 | 0.211 | 1.680 | 18.2 | −171.18 |
| S6 | | 36.885 | 0.157 | | | |
| S9 | Fifth Lens | −4.924 | 0.267 | 1.535 | 55.7 | 71.45 |
| S10 | | −4.447 | 0.222 | | | |
| S11 | Sixth Lens | 6.929 | 0.280 | 1.614 | 25.9 | −11.11 |
| S12 | | 3.401 | 0.185 | | | |
| S13 | Seventh Lens | 6.365 | 0.460 | 1.567 | 37.4 | 3.61 |
| S14 | | −2.961 | 0.561 | | | |
| S15 | Eighth Lens | 21.339 | 0.400 | 1.535 | 55.7 | −2.93 |
| S16 | | 1.456 | 0.200 | | | |
| S17 | Filter | Infinity | 0.110 | 1.517 | 64.2 | |
| S18 | | Infinity | 0.750 | | | |
| S19 | Imaging Plane | Infinity | | | | |

In the example optical imaging system in the third example embodiment, a total focal length f may be 4.55 mm, IMG HT may be 5.107 mm, FOV may be 94°, SAG52 may be −0.3826 mm, SAG62 may be −0.525 mm, SAG72 may be −0.8746 mm, and SAG82 may be −1.0396 mm.

In the third example embodiment, the first lens 310 may have positive refractive power, the first surface of the first lens 310 may be convex, and the second surface of the first lens 310 may be concave.

The second lens 320 may have negative refractive power, the first surface of the second lens 320 may be convex, and the second surface of the second lens 320 may be concave.

The third lens 330 may have positive refractive power, the first surface of the third lens 330 may be convex, and the second surface of the third lens 330 may be concave.

At least one inflection point may be formed on at least one of the first surface and the second surface of the seventh lens 370. In an example, the first surface of the seventh lens 370 may be convex in the paraxial region and concave in a portion or region other than the paraxial region. The second surface of the seventh lens 370 may be convex in the paraxial region and concave in a portion or region other than the paraxial region.

Each surface of the first lens 310 to the eighth lens 380 may have an aspherical coefficient, as illustrated in Table 6 below. In an example, both the object-side surfaces and the image-side surfaces of the first lens 310 to the eighth lens 380 may be aspherical.

TABLE 6

| Surface No. | S1 | S2 | S3 | S4 | S5 | S6 | S7 | S8 |
|---|---|---|---|---|---|---|---|---|
| Conic Coefficient (K) | −2.709 | −61.458 | 34.971 | 12.433 | 4.387 | 99.000 | 49.654 | 99.000 |
| 4th Coefficient (A) | 1.199E−02 | −3.232E−02 | −5.947E−02 | −4.416E−02 | −1.540E−02 | −1.668E−02 | −1.181E−01 | −6.184E−02 |
| 6th Coefficient (B) | 1.761E−01 | 2.845E−01 | 4.685E−01 | 6.253E−01 | −1.222E−02 | 3.495E−03 | 3.523E−01 | −1.268E−01 |
| 8th Coefficient (C) | −1.045E+00 | −2.029E+00 | −3.659E+00 | −7.690E+00 | 2.717E−03 | −5.432E−01 | −2.367E+00 | 1.707E+00 |
| 10th Coefficient (D) | 3.862E+00 | 8.785E+00 | 1.812E+01 | 5.508E+01 | 2.224E+00 | 7.030E+00 | 8.894E+00 | −1.134E+01 |
| 12th Coefficient (E) | −9.726E+00 | −2.559E+01 | −5.763E+01 | −2.496E+02 | −2.239E+01 | −4.577E+01 | −1.920E+01 | 4.331E+01 |
| 14th Coefficient (F) | 1.718E+01 | 5.248E+01 | 1.235E+02 | 7.662E+02 | 1.138E+02 | 1.824E+02 | 1.193E+01 | −1.087E+02 |
| 16th Coefficient (G) | −2.175E+01 | −7.760E+01 | −1.836E+02 | −1.656E+03 | −3.576E+02 | −4.825E+02 | 6.037E+01 | 1.898E+02 |
| 18th Coefficient (H) | 1.994E+01 | 8.363E+01 | 1.914E+02 | 2.571E+03 | 7.482E+02 | 8.825E+02 | −2.177E+02 | −2.368E+02 |
| 20th Coefficient (J) | −1.324E+01 | −6.568E+01 | −1.393E+02 | −2.883E+03 | −1.073E+03 | −1.134E+03 | 3.784E+02 | 2.125E+02 |
| 22nd Coefficient (L) | 6.303E+00 | 3.715E+01 | 6.900E+01 | 2.314E+03 | 1.061E+03 | 1.022E+03 | −4.100E+02 | −1.361E+02 |
| 24th Coefficient (M) | 2.093E+00 | 1.473E+01 | 2.198E+01 | 1.297E+03 | 7.113E+02 | 6.328E+02 | 2.889E+02 | 6.063E+01 |
| 26th Coefficient (N) | 4.603E−01 | 3.878E+00 | 3.947E+00 | 4.821E+02 | 3.092E+02 | 2.562E+02 | −1.293E+02 | −1.780E+01 |
| 28th Coefficient (O) | −6.019E−02 | −6.089E−01 | −2.549E−01 | −1.067E+02 | −7.859E+01 | −6.108E+01 | 3.350E+01 | 3.090E+00 |
| 30th Coefficient (P) | 3.540E−03 | 4.312E−02 | 1.387E−02 | 1.064E+01 | 8.872E+00 | 6.499E+00 | 3.835E+00 | −2.394E−01 |

| Surface No. | S9 | S10 | S11 | S12 | S13 | S14 | S15 | S16 |
|---|---|---|---|---|---|---|---|---|
| Conic Coefficient (K) | 4.231 | 0.145 | −4.886 | −2.383 | 5.162 | −14.957 | 4.306 | −6.566 |
| 4th Coefficient (A) | 2.894E−02 | −2.602E−02 | −1.452E−01 | −1.569E−01 | 8.366E−02 | 8.047E−02 | −2.299E−01 | −1.247E−01 |
| 6th Coefficient (B) | −1.800E−01 | 2.189E−01 | 2.088E−01 | 9.878E−02 | −2.519E−01 | −7.557E−02 | 1.087E−01 | 7.370E−02 |
| 8th Coefficient (C) | 2.202E+00 | −5.142E−01 | −1.417E−03 | −4.505E−02 | 4.039E−01 | 3.639E−02 | −2.127E−02 | −3.026E−02 |
| 10th Coefficient (D) | −1.300E+01 | −3.103E−01 | −1.323E+00 | −5.932E−02 | −4.803E−01 | 4.680E−02 | −7.955E−03 | 8.266E−03 |
| 12th Coefficient (E) | 4.344E+01 | 3.622E+00 | 3.981E+00 | 1.528E−01 | 4.372E−01 | −9.843E−02 | 8.209E−03 | −1.334E−03 |
| 14th Coefficient (F) | −9.413E+01 | −8.422E+00 | −6.586E+00 | −1.805E−01 | −3.136E−01 | 8.306E−02 | −3.268E−03 | 5.305E−05 |
| 16th Coefficient (G) | 1.411E+02 | 1.128E+01 | 7.165E+00 | 1.412E−01 | 1.748E−01 | −4.249E−02 | 7.880E−04 | −2.905E−05 |
| 18th Coefficient (H) | −1.508E+02 | −1.005E+01 | −5.411E+00 | −7.740E−02 | −7.356E−02 | 1.456E−02 | −1.268E−04 | −7.771E−06 |
| 20th Coefficient (J) | 1.161E+02 | 6.221E+00 | 2.887E+00 | 2.984E−02 | 2.274E−02 | −3.457E−03 | 1.411E−05 | 1.032E−06 |
| 22nd Coefficient (L) | 6.408E+01 | 2.702E+00 | 1.084E+00 | −7.998E−03 | 5.024E−03 | 5.715E−04 | 1.091E−06 | 8.536E−08 |
| 24th Coefficient (M) | 2.475E+01 | 8.098E−01 | 2.800E−01 | 1.452E−03 | 7.666E−04 | −6.462E−05 | 5.775E−08 | 4.553E−09 |
| 26th Coefficient (N) | −6.357E+00 | −1.598E−01 | −4.733E−02 | −1.700E−04 | −7.650E−05 | 4.765E−06 | −1.994E−09 | −1.523E−10 |
| 28th Coefficient (O) | 9.753E−01 | 1.868E−02 | 4.705E−03 | 1.155E−05 | 4.484E−06 | −2.065E−07 | 4.053E−11 | 2.900E−12 |
| 30th Coefficient (P) | −6.760E−02 | −9.794E−04 | −2.083E−04 | −3.460E−07 | −1.169E−07 | 3.988E−09 | −3.675E−13 | −2.388E−14 |

Figure 6:
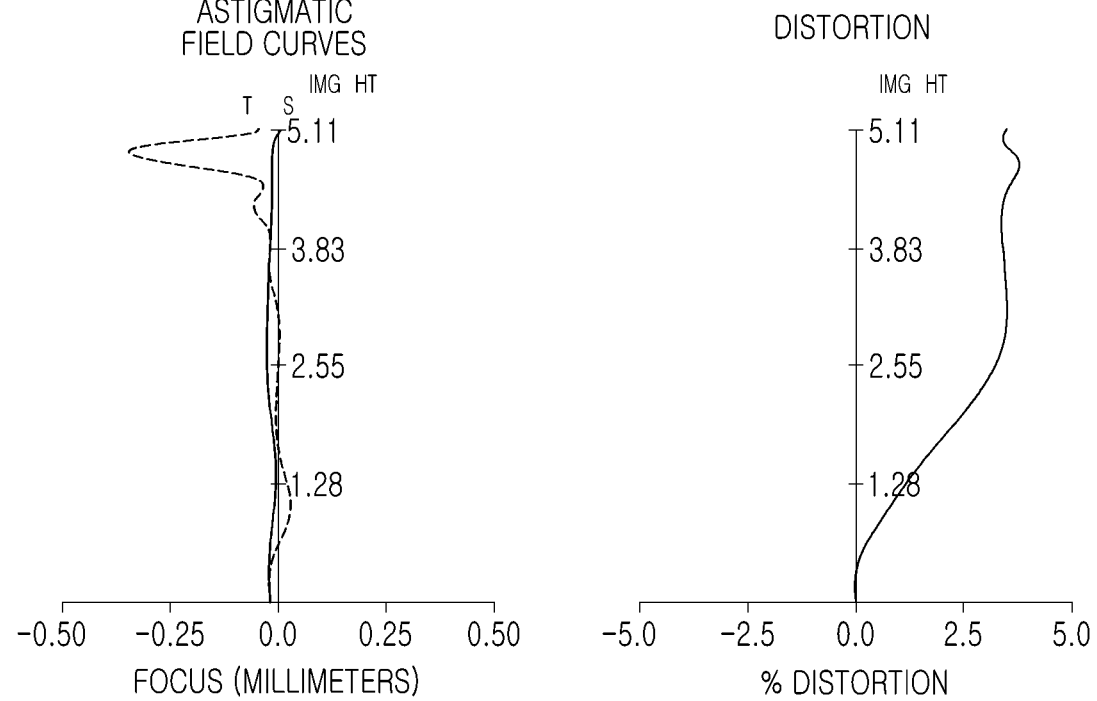
FIG. 6 is a diagram illustrating aberration properties of the example optical imaging system illustrated in FIG. 5.

The above-configured optical imaging system may have aberration properties as illustrated in FIG. 6.

Figure 7:
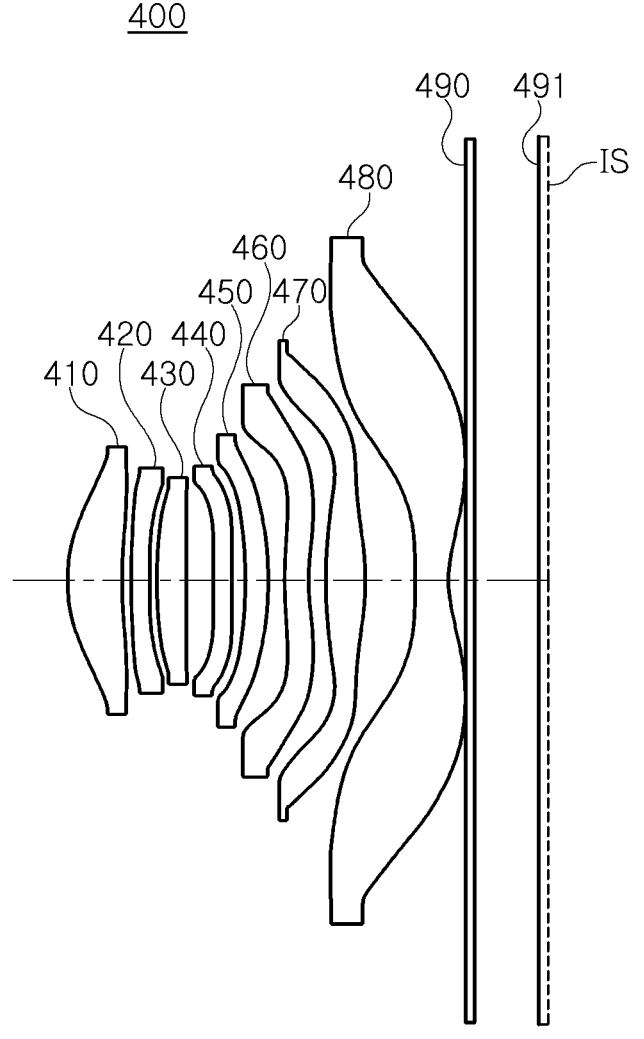
FIG. 7 is a diagram illustrating an example optical imaging system according to a fourth example embodiment.

An example optical imaging system according to a fourth example embodiment will be described with reference to FIGS. 7 and 8.

An example optical imaging system 400 in the fourth example embodiment may include an optical system including a first lens 410, a second lens 420, a third lens 430, a fourth lens 440, a fifth lens 450, a sixth lens 460, a seventh lens 470, and an eighth lens 480, and may further include a filter 490 and an image sensor IS.

The optical imaging system 400 in the fourth example embodiment may form a focused image on an imaging plane 491. The imaging plane 491 may refer to a surface on which a focused image is formed by an optical imaging system. In an example, the imaging plane 491 may refer to one surface of the image sensor IS on which light is received.

The lens properties (a radius of curvature, a thickness of the lens or a distance between the lenses, a refractive index, an Abbe number, and a focal length) of each lens are listed in Table 7 below.

TABLE 7

| Surface No. | Note | Radius of Curvature | Thickness or Distance | Refractive Index | Abbe Number | Focal Length |
|---|---|---|---|---|---|---|
| S1 | First Lens | 2.039 | 0.628 | 1.544 | 56.0 | 5.2 |
| S2 | | 6.432 | 0.109 | | | |
| S3 | Second Lens | 10.647 | 0.210 | 1.680 | 18.2 | −14.34 |
| S4 | | 5.084 | 0.093 | | | |
| S5 | Third Lens | 5.781 | 0.338 | 1.535 | 55.7 | 12.96 |
| S6 | | 33.327 | 0.321 | | | |
| S7 | Fourth Lens | 49.315 | 0.216 | 1.680 | 18.2 | 517.71 |
| S8 | | 57.123 | 0.144 | | | |
| S9 | Fifth Lens | −5.135 | 0.265 | 1.535 | 55.7 | −107.68 |
| S10 | | −5.737 | 0.206 | | | |
| S11 | Sixth Lens | 4.972 | 0.280 | 1.614 | 25.9 | −16.05 |
| S12 | | 3.244 | 0.197 | | | |
| S13 | Seventh Lens | 6.359 | 0.460 | 1.544 | 56.0 | 3.74 |
| S14 | | −2.932 | 0.573 | | | |
| S15 | Eighth Lens | 21.224 | 0.400 | 1.535 | 55.7 | −2.94 |
| S16 | | 1.461 | 0.200 | | | |
| S17 | Filter | Infinity | 0.110 | 1.517 | 64.2 | |
| S18 | | Infinity | 0.750 | | | |
| S19 | Imaging Plane | Infinity | | | | |

In the example optical imaging system in the fourth example embodiment, a total focal length f may be 4.56 mm, IMG HT may be 5.107 mm, FOV may be 94°, SAG52 may be −0.3654 mm, SAG62 may be −0.4809 mm, SAG72 may be −0.92 mm, and SAG82 may be −1.0601 mm.

In the fourth example embodiment, the first lens 410 may have positive refractive power, the first surface of the first lens 410 may be convex, and the second surface of the first lens 410 may be concave.

The second lens 420 may have negative refractive power, the first surface of the second lens 420 may be convex, and the second surface of the second lens 420 may be concave.

The third lens 430 may have positive refractive power, the first surface of the third lens 430 may be convex, and the second surface of the third lens 430 may be concave.

The fourth lens 440 may have positive refractive power, the first surface of the fourth lens 440 may be convex, and the second surface of the fourth lens 440 may be concave.

The fifth lens 450 may have negative refractive power, the first surface of the fifth lens 450 may be concave, and the second surface of the fifth lens 450 may be convex.

The sixth lens 460 may have negative refractive power, the first surface of the sixth lens 460 may be convex in a paraxial region, and the second surface of the sixth lens 460 may be concave in the paraxial region.

At least one inflection point is formed on at least one of the first surface and the second surface of the sixth lens 460. In an example, the first surface of the sixth lens 460 may be convex in the paraxial region and concave in a portion or region other than the paraxial region. The second surface of the sixth lens 460 may be concave in the paraxial region and convex in a portion or region other than the paraxial region.

The seventh lens 470 may have positive refractive power, and the first surface of the seventh lens 470 may be convex in a paraxial region, and the second surface of the seventh lens 470 may be convex in the paraxial region.

At least one inflection point may be formed on at least one of the first surface and the second surface of the seventh lens 470. In an example, the first surface of the seventh lens 470 may be convex in the paraxial region and concave in a portion or region other than the paraxial region. The second surface of the seventh lens 470 may be convex in the paraxial region and concave in a portion or region other than the paraxial region.

The eighth lens 480 may have negative refractive power, the first surface of the eighth lens 480 may be convex in the paraxial region, and the second surface of the eighth lens 480 may be concave in the paraxial region.

At least one inflection point may be formed on at least one of the first and second surfaces of the eighth lens 480. In an example, the first surface of the eighth lens 480 may be convex in the paraxial region and concave in a portion or region other than the paraxial region. The second surface of the eighth lens 480 may be concave in the paraxial region and convex in a portion or region other than the paraxial region.

Each surface of the first lens 410 to the eighth lens 480 may have an aspherical coefficient, as illustrated in Table 8 below. In an example, both the object-side surfaces and the image-side surfaces of the first lens 410 to the eighth lens 480 may be aspherical.

TABLE 8

| Surface No. | S1 | S2 | S3 | S4 | S5 | S6 | S7 | S8 |
|---|---|---|---|---|---|---|---|---|
| Conic Coefficient (K) | −2.778 | −61.973 | 34.975 | 12.319 | 4.169 | 58.449 | 99.000 | 99.000 |
| 4th Coefficient (A) | 1.048E−02 | −3.203E−02 | −5.395E−02 | −4.477E−02 | −1.686E−02 | −2.151E−02 | −1.569E−01 | −1.015E−01 |
| 6th Coefficient (B) | 1.711E−01 | 2.779E−01 | 3.788E−01 | 6.594E−01 | −8.453E−03 | 4.486E−02 | 9.759E−01 | 4.276E−01 |
| 8th Coefficient (C) | −9.772E−01 | −1.910E+00 | −2.804E+00 | −8.522E+00 | −1.659E−03 | −6.939E−01 | −7.347E+00 | −1.930E+00 |
| 10th Coefficient (D) | 3.497E+00 | 8.017E+00 | 1.397E+01 | 6.367E+01 | 2.123E+00 | 7.317E+00 | 3.445E+01 | 3.805E+00 |

TABLE 8-continued

| | | | | | | | | |
|---|---|---|---|---|---|---|---|---|
| 12th Coefficient (E) | −8.571E+00 | −2.271E+01 | −4.603E+01 | −2.997E+02 | −2.133E+01 | −4.588E+01 | −1.080E+02 | 1.163E−01 |
| 14th Coefficient (F) | 1.478E+01 | 4.533E+01 | 1.046E+02 | 9.526E+02 | 1.077E+02 | 1.813E+02 | 2.270E+02 | −2.117E+01 |
| 16th Coefficient (G) | −1.829E+01 | −6.520E+01 | −1.691E+02 | −2.129E+03 | −3.365E+02 | −4.789E+02 | −3.094E+02 | 6.139E+01 |
| 18th Coefficient (H) | 1.641E+01 | 6.832E+01 | 1.975E+02 | 3.413E+03 | 6.991E+02 | 8.753E+02 | 2.355E+02 | −9.919E+01 |
| 20th Coefficient (J) | −1.066E+01 | −5.214E+01 | −1.678E+02 | −3.951E+03 | −9.959E+02 | −1.124E+03 | −1.468E+01 | 1.051E+02 |
| 22nd Coefficient (L) | 4.964E+00 | 2.865E+01 | 1.028E+02 | 3.275E+03 | 9.781E+02 | 1.012E+03 | −1.742E+02 | −7.588E+01 |
| 24th Coefficient (M) | −1.613E+00 | −1.103E+01 | −4.439E+01 | −1.896E+03 | −6.518E+02 | −6.260E+02 | 1.957E+02 | 3.706E+01 |
| 26th Coefficient (N) | 3.470E−01 | 2.821E+00 | 1.284E+01 | 7.279E+02 | 2.815E+02 | 2.531E+02 | −1.074E+02 | −1.173E+01 |
| 28th Coefficient (O) | −4.440E−02 | −4.302E−01 | −2.237E+00 | −1.665E+02 | −7.115E+01 | −6.026E+01 | 3.110E+01 | 2.172E+00 |
| 30th Coefficient (P) | 2.557E−03 | 2.950E−02 | 1.778E−01 | 1.716E+01 | 7.989E+00 | 6.402E+00 | −3.810E+00 | −1.784E−01 |

| Surface No. | S9 | S10 | S11 | S12 | S13 | S14 | S15 | S16 |
|---|---|---|---|---|---|---|---|---|
| Conic Coefficient (K) | 4.135 | 3.168 | −7.809 | −2.108 | 5.206 | −13.251 | −0.479 | −7.503 |
| 4th Coefficient (A) | 3.703E−02 | −9.517E−03 | −1.337E−01 | −1.644E−01 | 5.331E−02 | 6.851E−02 | −2.469E−01 | −1.098E−01 |
| 6th Coefficient (B) | −1.114E−01 | 1.622E−01 | 1.690E−01 | 1.237E−01 | −1.604E−01 | −4.776E−02 | 1.372E−01 | 5.487E−02 |
| 8th Coefficient (C) | 1.668E+00 | −4.438E−01 | 6.764E−02 | −8.963E−02 | 2.030E−01 | −1.239E−03 | −4.568E−02 | −1.516E−02 |
| 10th Coefficient (D) | −1.137E+01 | −2.716E−01 | −1.292E+00 | 1.859E−02 | −1.591E−01 | 8.390E−02 | 4.115E−03 | −1.086E−04 |
| 12th Coefficient (E) | 4.041E+01 | 3.192E+00 | 3.607E+00 | 4.822E−02 | 7.088E−02 | −1.274E−01 | 4.551E−03 | 1.902E−03 |
| 14th Coefficient (F) | −9.030E+01 | −7.340E+00 | −5.763E+00 | −7.844E−02 | −1.395E−02 | 1.008E−01 | −2.578E−03 | −8.319E−04 |
| 16th Coefficient (G) | 1.376E+02 | 9.676E+00 | 6.118E+00 | 6.863E−02 | −1.821E−03 | −5.071E−02 | 7.124E−04 | 2.030E−04 |
| 18th Coefficient (H) | −1.481E+02 | −8.465E+00 | −4.525E+00 | −3.972E−02 | 1.579E−03 | 1.734E−02 | −1.241E−04 | −3.257E−05 |
| 20th Coefficient (J) | 1.143E+02 | 5.146E+00 | 2.368E+00 | 1.570E−02 | −2.521E−04 | −4.131E−03 | 1.459E−05 | 3.592E−06 |
| 22nd Coefficient (L) | −6.300E+01 | −2.194E+00 | −8.727E−01 | −4.231E−03 | −3.132E−05 | 6.871E−04 | −1.180E−06 | −2.745E−07 |
| 24th Coefficient (M) | 2.423E+01 | 6.459E−01 | 2.214E−01 | 7.632E−04 | 1.811E−05 | −7.821E−05 | 6.490E−08 | 1.429E−08 |
| 26th Coefficient (N) | −6.186E+00 | −1.251E−01 | −3.673E−02 | −8.800E−05 | −2.953E−06 | 5.808E−06 | −2.325E−09 | −4.831E−10 |
| 28th Coefficient (O) | 9.422E−01 | 1.437E−02 | 3.585E−03 | 5.860E−06 | 2.274E−07 | −2.535E−07 | 4.902E−11 | 9.568E−12 |
| 30th Coefficient (P) | −6.479E−02 | −7.402E−04 | −1.558E−04 | −1.714E−07 | −7.051E−09 | 4.930E−09 | −4.619E−13 | −8.420E−14 |

Figure 8:
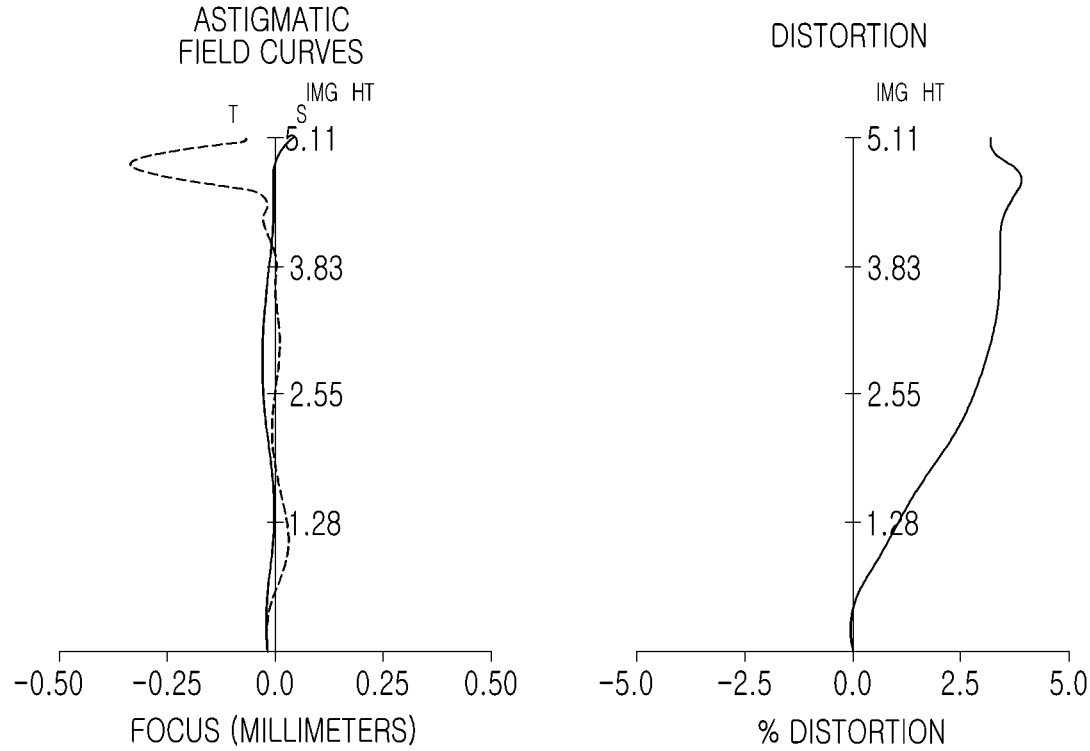
FIG. 8 is a diagram illustrating aberration properties of the example optical imaging system illustrated in FIG. 7.

The above-configured optical imaging system may have aberration properties illustrated in FIG. 8.

Figure 9:
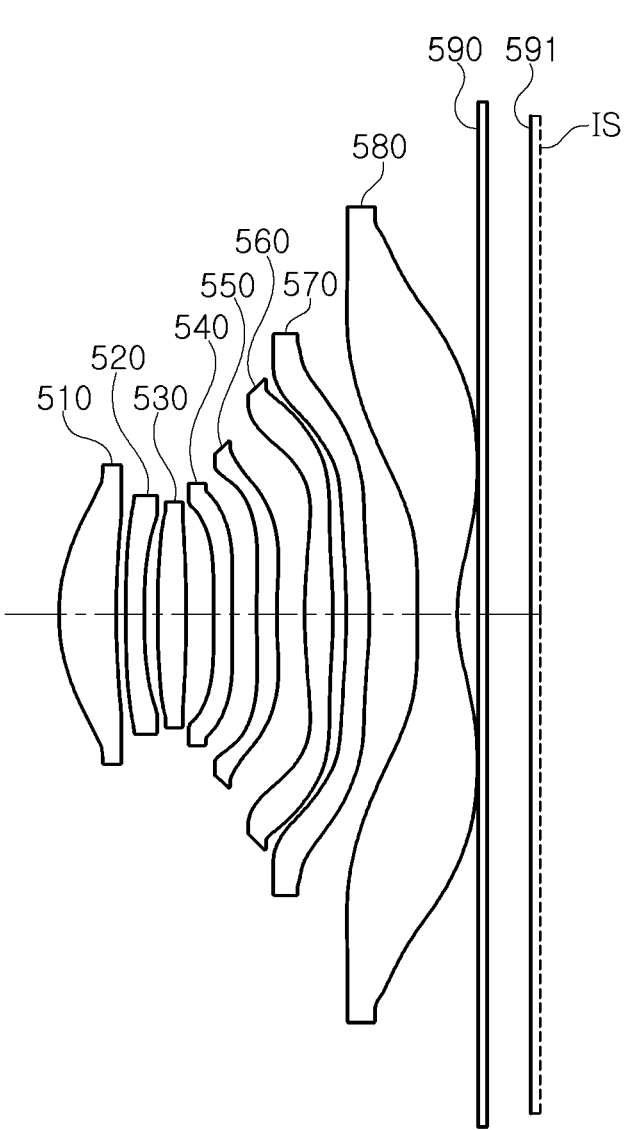
FIG. 9 is a diagram illustrating an example optical imaging system according to a fifth example embodiment.

An example optical imaging system according to a fifth example embodiment will be described with reference to FIGS. 9 and 10.

An example optical imaging system 500 in the fifth example embodiment may include an optical system including a first lens 510, a second lens 520, a third lens 530, a fourth lens 540, a fifth lens 550, a sixth lens 560, a seventh lens 570, and an eighth lens 580, and may further include a filter 590 and an image sensor IS.

The example optical imaging system 500 in the fifth example embodiment may form a focused image on an imaging plane 591. The imaging plane 591 may refer to a surface on which a focused image is formed by an optical imaging system. In an example, the imaging plane 591 may refer to one surface of the image sensor IS on which light is received.

The lens properties (a radius of curvature, a thickness of the lens or a distance between the lenses, a refractive index, an Abbe number, and a focal length) of each lens are listed in Table 9 below.

TABLE 9

| Surface No. | Note | Radius of Curvature | Thickness or Distance | Refractive Index | Abbe Number | Focal Length |
|---|---|---|---|---|---|---|
| S1 | First Lens | 1.963 | 0.656 | 1.544 | 56.0 | 5.1 |
| S2 | | 5.865 | 0.115 | | | |
| S3 | Second Lens | 8.535 | 0.220 | 1.680 | 18.2 | −14.84 |
| S4 | | 4.604 | 0.155 | | | |

TABLE 9-continued

| Surface No. | Note | Radius of Curvature | Thickness or Distance | Refractive Index | Abbe Number | Focal Length |
|---|---|---|---|---|---|---|
| S5 | Third Lens | 8.271 | 0.322 | 1.535 | 55.7 | 12.79 |
| S6 | | −39.946 | 0.329 | | | |
| S7 | Fourth Lens | −17.342 | 0.221 | 1.650 | 21.5 | −28.91 |
| S8 | | −198.968 | 0.282 | | | |
| S9 | Fifth Lens | 6.045 | 0.239 | 1.567 | 37.4 | −40.46 |
| S10 | | 4.722 | 0.323 | | | |
| S11 | Sixth Lens | 6.211 | 0.330 | 1.544 | 56.0 | 5.2 |
| S12 | | −5.143 | 0.150 | | | |
| S13 | Seventh Lens | −5.466 | 0.268 | 1.635 | 24.0 | 48.83 |
| S14 | | −4.743 | 0.563 | | | |
| S15 | Eighth Lens | 14.803 | 0.466 | 1.535 | 55.7 | −3.33 |
| S16 | | 1.580 | 0.250 | | | |
| S17 | Filter | Infinity | 0.110 | 1.517 | 64.2 | |
| S18 | | Infinity | 0.500 | | | |
| S19 | Imaging Plane | Infinity | | | | |

In the example optical imaging system 500 in the fifth example embodiment, a total focal length f may be 4.54 mm, IMG HT may be 5.107 mm, FOV may be 93.3°, SAG52 may be −0.552 mm, SAG62 may be −0.7887 mm, SAG72 may be −0.8231 mm, and SAG82 is −0.9454 mm.

In the fifth example embodiment, the first lens 510 may have positive refractive power, the first surface of the first lens 510 may be convex, and the second surface of the first lens 510 may be concave.

The second lens 520 may have negative refractive power, the first surface of the second lens 520 may be convex, and the second surface of the second lens 520 may be concave.

The third lens 530 may have positive refractive power, and the first surface of the third lens 530 may be convex, and the second surface of the third lens 530 may be convex.

The fourth lens 540 may have negative refractive power, the first surface of the fourth lens 540 may be concave, and the second surface of the fourth lens 540 may be convex.

The fifth lens 550 may have negative refractive power, the first surface of the fifth lens 550 may be convex, and the second surface of the fifth lens 550 may be concave.

The sixth lens 560 may have positive refractive power, and the first surface of the sixth lens 560 may be convex in a paraxial region, and the second surface of the sixth lens 560 may be convex in a paraxial region.

At least one inflection point may be formed on at least one of the first surface and the second surface of the sixth lens 560. In an example, the first surface of the sixth lens 560 may be convex in the paraxial region and concave in a portion or region other than the paraxial region. The second surface of the sixth lens 560 may be convex in the paraxial region and concave in a portion or region other than the paraxial region.

The seventh lens 570 may have positive refractive power, and the first surface of the seventh lens 570 may be concave in the paraxial region, and the second surface of the seventh lens 570 may be convex in the paraxial region.

At least one inflection point may be formed on at least one of the first surface and the second surface of the seventh lens 570. In an example, the first surface of the seventh lens 570 may be concave in the paraxial region and convex in a portion or other than the paraxial region. The second surface of the seventh lens 570 may be convex in the paraxial region and concave in a portion or region other than the paraxial region.

The eighth lens 580 may have negative refractive power, the first surface of the eighth lens 580 may be convex in the paraxial region, and the second surface of the eighth lens 580 may be concave in the paraxial region.

At least one inflection point may be formed on at least one of the first and second surfaces of the eighth lens 580. In an example, the first surface of the eighth lens 580 may be convex in the paraxial region and concave in a portion or region other than the paraxial region. The second surface of the eighth lens 580 may be concave in the paraxial region and convex in a portion or region other than the paraxial region.

Each surface of the first lens 510 to the eighth lens 580 may have an aspherical coefficient, as illustrated in Table 10 below. In an example, both the object-side surfaces and the image-side surfaces of the first lens 510 to the eighth lens 580 may be aspherical.

TABLE 10

| Surface No. | S1 | S2 | S3 | S4 | S5 | S6 | S7 | S8 |
|---|---|---|---|---|---|---|---|---|
| Conic Coefficient (K) | −2.011 | −34.934 | 21.559 | 12.983 | 16.496 | −81.295 | 13.393 | −99.000 |
| 4th Coefficient (A) | 2.753E−02 | −3.716E−02 | −7.271E−02 | 2.740E−02 | 1.445E−02 | −2.580E−03 | −6.648E−02 | −7.998E−02 |
| 6th Coefficient (B) | −2.242E−02 | 2.847E−01 | 5.071E−01 | −1.280E+00 | −6.088E−01 | −3.906E−01 | −3.940E−01 | −1.998E−01 |
| 8th Coefficient (C) | 2.757E−01 | −1.825E+00 | −4.149E+00 | 1.613E+01 | 6.549E+00 | 4.572E+00 | 4.307E+00 | 2.080E+00 |
| 10th Coefficient (D) | −1.592E+00 | 7.516E+00 | 2.349E+01 | −1.250E+02 | −4.516E+01 | −3.299E+01 | −2.816E+01 | −1.067E+01 |
| 12th Coefficient (E) | 5.313E+00 | −2.114E+01 | −8.893E+01 | 6.541E+02 | 2.139E+02 | 1.561E+02 | 1.201E+02 | 3.476E+01 |
| 14th Coefficient (F) | −1.151E+01 | 4.213E+01 | 2.337E+02 | −2.398E+03 | −7.178E+02 | −5.077E+02 | −3.561E+02 | −7.822E+01 |

TABLE 10-continued

| | | | | | | | | |
|---|---|---|---|---|---|---|---|---|
| 16th Coefficient (G) | 1.704E+01 | −6.078E+01 | −4.377E+02 | 6.302E+03 | 1.738E+03 | 1.169E+03 | 7.571E+02 | 1.259E+02 |
| 18th Coefficient (H) | −1.772E+01 | 6.405E+01 | 5.923E+02 | −1.199E+04 | −3.061E+03 | −1.933E+03 | −1.172E+03 | −1.470E+02 |
| 20th Coefficient (J) | 1.307E+01 | −4.920E+01 | −5.807E+02 | 1.653E+04 | 3.915E+03 | 2.304E+03 | 1.325E+03 | 1.247E+02 |
| 22nd Coefficient (L) | −6.794E+00 | 2.720E+01 | 4.086E+02 | −1.634E+04 | −3.590E+03 | −1.961E+03 | −1.082E+03 | −7.610E+01 |
| 24th Coefficient (M) | 2.435E+00 | −1.052E+01 | −2.010E+02 | 1.127E+04 | 2.298E+03 | 1.162E+03 | 6.217E+02 | 3.247E+01 |
| 26th Coefficient (N) | −5.722E−01 | 2.696E+00 | 6.566E+01 | −5.154E+03 | −9.730E+02 | −4.548E+02 | −2.383E+02 | −9.182E+00 |
| 28th Coefficient (O) | 7.933E−02 | −4.111E−01 | −1.278E+01 | 1.403E+03 | 2.447E+02 | 1.057E+02 | 5.470E+01 | 1.543E+00 |
| 30th Coefficient (P) | −4.916E−03 | 2.820E−02 | 1.123E+00 | −1.720E+02 | −2.765E+01 | −1.104E+01 | −5.685E+00 | −1.163E−01 |

| Surface No. | S9 | S10 | S11 | S12 | S13 | S14 | S15 | S16 |
|---|---|---|---|---|---|---|---|---|
| Conic | −34.475 | 0.660 | 5.390 | −5.584 | −1.584 | −8.645 | −6.424 | −5.336 |
| Coefficient (K) 4th Coefficient (A) | −2.204E−01 | −2.690E−01 | −2.303E−02 | 8.532E−03 | 1.943E−02 | 4.225E−02 | −2.078E−01 | −1.257E−01 |
| 6th Coefficient (B) | 4.487E−01 | 3.815E−01 | 7.300E−02 | 3.023E−01 | 2.172E−01 | 6.955E−02 | 1.576E−01 | 9.835E−02 |
| 8th Coefficient (C) | −1.961E+00 | −1.288E+00 | −2.263E−01 | −7.386E−01 | −5.180E−01 | −1.722E−01 | −1.040E−01 | −5.848E−02 |
| 10th Coefficient (D) | 7.517E+00 | 3.732E+00 | 3.204E−01 | 1.024E+00 | 6.367E−01 | 1.846E−01 | 5.295E−02 | 2.499E−02 |
| 12th Coefficient (E) | −1.987E+01 | −7.560E+00 | −2.856E−01 | −9.539E−01 | −4.952E−01 | −1.240E−01 | −1.900E−02 | −7.684E−03 |
| 14th Coefficient (F) | 3.627E+01 | 1.074E+01 | 1.604E−01 | 6.230E−01 | 2.573E−01 | 5.588E−02 | 4.795E−03 | 1.717E−03 |
| 16th Coefficient (G) | −4.685E+01 | −1.091E+01 | −4.938E−02 | −2.909E−01 | −9.146E−02 | −1.747E−02 | −8.647E−04 | −2.808E−04 |
| 18th Coefficient (H) | 4.343E+01 | 7.998E+00 | 1.494E−03 | 9.800E−02 | 2.222E−02 | 3.850E−03 | 1.127E−04 | 3.374E−05 |
| 20th Coefficient (J) | −2.898E+01 | −4.241E+00 | 5.398E−03 | −2.379E−02 | −3.569E−03 | −6.002E−04 | −1.063E−05 | −2.963E−06 |
| 22nd Coefficient (L) | 1.378E+01 | 1.609E+00 | −2.372E−03 | 4.116E−03 | 3.400E−04 | 6.535E−05 | 7.186E−07 | 1.875E−07 |
| 24th Coefficient (M) | −4.546E+00 | −4.248E−01 | 5.198E−04 | −4.938E−04 | −1.120E−05 | −4.814E−06 | −3.397E−08 | −8.312E−09 |
| 26th Coefficient (N) | 9.879E−01 | 7.403E−02 | −6.541E−05 | 3.898E−05 | −1.223E−06 | 2.254E−07 | 1.065E−09 | 2.443E−10 |
| 28th Coefficient (O) | −1.269E−01 | −7.643E−03 | 4.503E−06 | −1.816E−06 | 1.473E−07 | −5.910E−09 | −1.993E−11 | −4.275E−12 |
| 30th Coefficient (P) | 7.279E−03 | 3.536E−04 | −1.318E−07 | 3.773E−08 | −4.829E−09 | 6.307E−11 | 1.681E−13 | 3.365E−14 |

Figure 10:
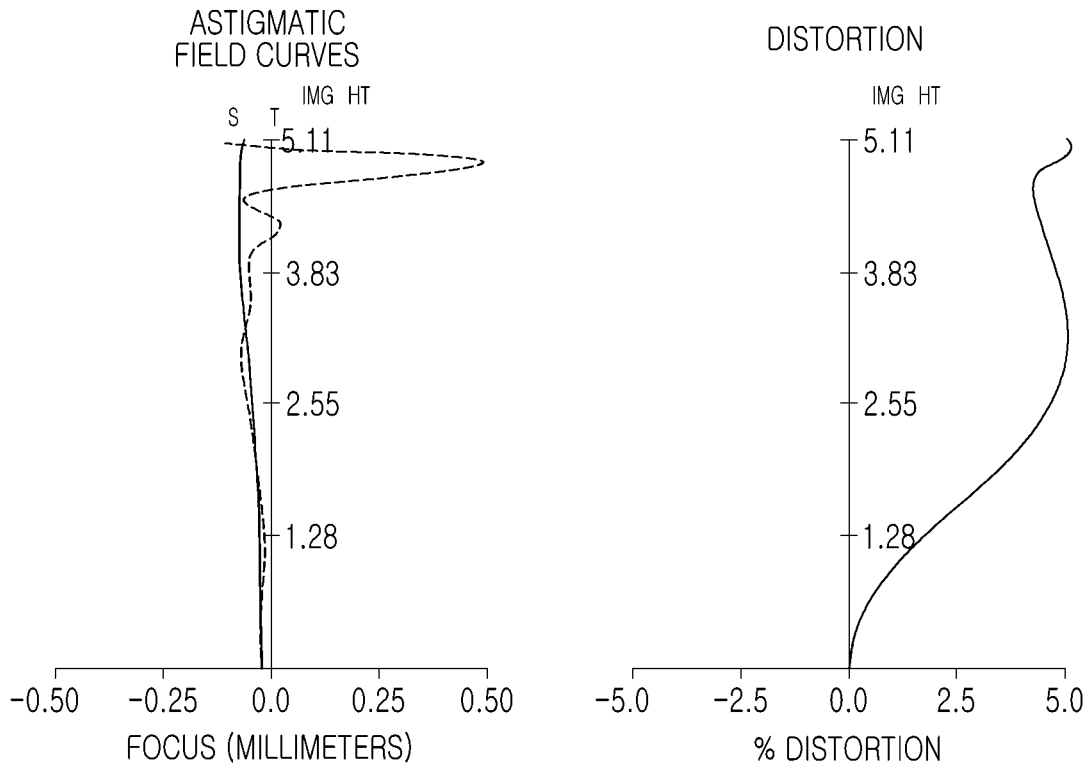
FIG. 10 is a diagram illustrating aberration properties of the example optical imaging system illustrated in FIG. 9.

The above-configured optical imaging system may have aberration properties as illustrated in FIG. 10.

Figure 11:
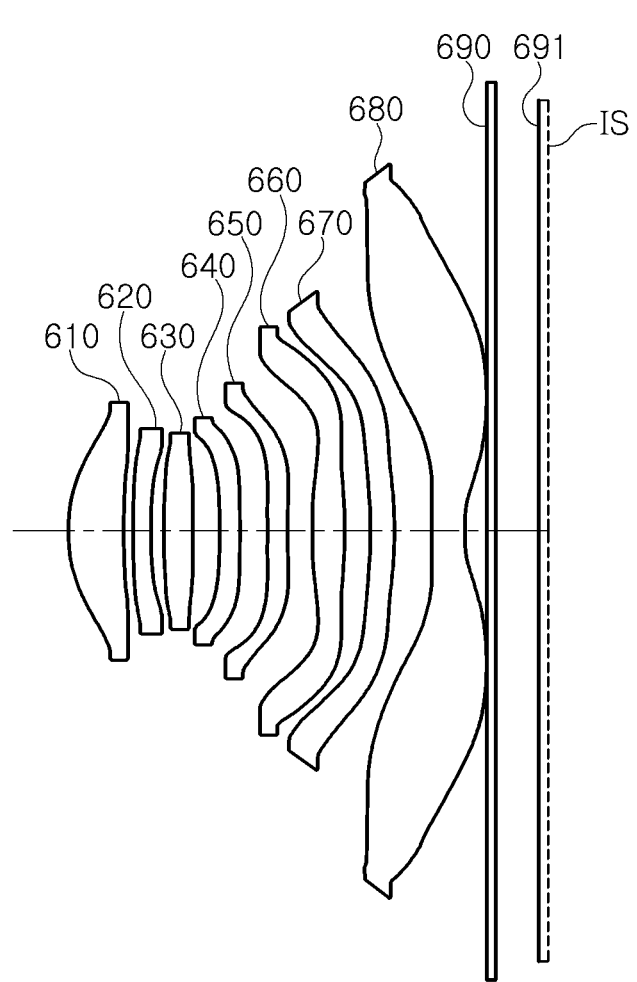
FIG. 11 is a diagram illustrating an example optical imaging system according to a sixth example embodiment.

An example optical imaging system according to a sixth example embodiment will be described with reference to FIGS. 11 and 12.

An example optical imaging system 600 in the sixth example embodiment may include an optical system including a first lens 610, a second lens 620, a third lens 630, a fourth lens 640, a fifth lens 650, a sixth lens 660, a seventh lens 670, and an eighth lens 680, and may further include a filter 690 and an image sensor IS.

The optical imaging system 600 in the sixth example embodiment may form a focused image on an imaging plane 691. The imaging plane 691 may refer to a surface on which a focused image is formed by an optical imaging system. In an example, the imaging plane 691 may refer to one surface of the image sensor IS on which light is received.

The lens properties (a radius of curvature, a thickness of the lens or a distance between the lenses, a refractive index, an Abbe number, and a focal length) of each lens are listed in Table 11 below.

TABLE 11

| Surface No. | Note | Radius of Curvature | Thickness or Distance | Refractive Index | Abbe Number | Focal Length |
|---|---|---|---|---|---|---|
| S1 | First Lens | 1.987 | 0.649 | 1.544 | 56.0 | 5.05 |
| S2 | | 6.277 | 0.108 | | | |
| S3 | Second Lens | 9.287 | 0.210 | 1.680 | 18.2 | −13.72 |
| S4 | | 4.642 | 0.152 | | | |
| S5 | Third Lens | 8.433 | 0.331 | 1.535 | 55.7 | 12.71 |
| S6 | | −35.328 | 0.319 | | | |
| S7 | Fourth Lens | −22.288 | 0.237 | 1.635 | 24.0 | −36.21 |
| S8 | | −561.996 | 0.317 | | | |

TABLE 11-continued

| Surface No. | Note | Radius of Curvature | Thickness or Distance | Refractive Index | Abbe Number | Focal Length |
|---|---|---|---|---|---|---|
| S9 | Fifth Lens | 6.172 | 0.240 | 1.567 | 37.4 | −33.44 |
| S10 | | 4.598 | 0.294 | | | |
| S11 | Sixth Lens | 6.134 | 0.375 | 1.544 | 56.0 | 5.06 |
| S12 | | −4.930 | 0.310 | | | |
| S13 | Seventh Lens | −4.705 | 0.279 | 1.650 | 21.5 | 33.67 |
| S14 | | −3.972 | 0.430 | | | |
| S15 | Eighth Lens | 11.610 | 0.390 | 1.535 | 55.7 | −3.26 |
| S16 | | 1.504 | 0.250 | | | |
| S17 | Filter | Infinity | 0.110 | 1.517 | 64.2 | |
| S18 | | Infinity | 0.500 | | | |
| S19 | Imaging Plane | Infinity | | | | |

In the example optical imaging system according to the sixth example embodiment, a total focal length f may be 4.5 mm, IMG HT may be 5.107 mm, FOV may be 93.8°, SAG52 may be −0.5225 mm, SAG62 may be −0.7846 mm, SAG72 may be −0.909 mm, and SAG82 may be −0.8748 mm.

In the sixth example embodiment, the first lens 610 may have positive refractive power, the first surface of the first lens 610 may be convex, and the second surface of the first lens 610 may be concave.

The second lens 620 may have negative refractive power, the first surface of the second lens 620 may be convex, and the second surface of the second lens 620 may be concave.

The third lens 630 may have positive refractive power, and the first surface of the third lens 630 may be convex, and the second surface of the third lens 630 may be convex.

The fourth lens 640 may have negative refractive power, the first surface of the fourth lens 640 may be concave, and the second surface of the fourth lens 640 may be convex.

The fifth lens 650 may have negative refractive power, the first surface of the fifth lens 650 may be convex, and the second surface of the fifth lens 650 may be concave.

The sixth lens 660 may have positive refractive power, and the first surface of the sixth lens 660 may be convex in a paraxial region, and the second surface of the sixth lens 660 may be convex in a paraxial region.

At least one inflection point may be formed on at least one of the first surface and the second surface of the sixth lens 660. In an example, the first surface of the sixth lens 660 may be convex in the paraxial region and concave in a portion or region other than the paraxial region. The second surface of the sixth lens 660 may be convex in the paraxial region and concave in a portion or region other than the paraxial region.

The seventh lens 670 may have positive refractive power, the first surface of the seventh lens 670 may be concave in the paraxial region, and the second surface of the seventh lens 670 may be convex in the paraxial region.

At least one inflection point may be formed on at least one of the first surface and the second surface of the seventh lens 670. In an example, the first surface of the seventh lens 670 may be concave in the paraxial region and convex in a portion or region other than the paraxial region. The second surface of the seventh lens 670 may be convex in the paraxial region and concave in a portion or region other than the paraxial region.

The eighth lens 680 may have negative refractive power, the first surface of the eighth lens 680 may be convex in the paraxial region, and the second surface of the eighth lens 680 may be concave in the paraxial region.

At least one inflection point may be formed on at least one of the first surface and the second surface of the eighth lens 680. In an example, the first surface of the eighth lens 680 may be convex in the paraxial region and concave in a portion or region other than the paraxial region. The second surface of the eighth lens 680 may be concave in the paraxial region and convex in a portion or region other than the paraxial region.

Each surface of the first lens 610 to the eighth lens 680 may have an aspherical coefficient, as illustrated in Table 12 below. In an example, both the object-side surfaces and the image-side surfaces of the first lens 610 to the eighth lens 680 may be aspherical.

TABLE 12

| Surface No. | S1 | S2 | S3 | S4 | S5 | S6 | S7 | S8 |
|---|---|---|---|---|---|---|---|---|
| Conic Coefficient (K) | −2.113 | −39.075 | 23.170 | 12.723 | 15.602 | 61.916 | −24.846 | −99.000 |
| 4th Coefficient (A) | 2.769E−02 | −4.387E−02 | −6.892E−02 | 2.898E−02 | −5.634E−03 | −3.855E−02 | −9.571E−02 | −1.002E−01 |
| 6th Coefficient (B) | 2.077E−03 | 3.841E−01 | 4.889E−01 | −1.225E+00 | −2.106E−01 | 2.907E−01 | 4.001E−02 | 4.750E−02 |
| 8th Coefficient (C) | −9.467E−03 | −2.705E+00 | −3.988E+00 | 1.518E+01 | 2.447E+00 | −2.886E+00 | 2.691E−02 | 1.401E−01 |
| 10th Coefficient (D) | −1.225E−01 | 1.208E+01 | 2.246E+01 | −1.172E+02 | −1.873E+01 | 1.895E+01 | −5.604E−01 | −9.978E−01 |
| 12th Coefficient (E) | 8.428E−01 | −3.636E+01 | −8.458E+01 | 6.148E+02 | 9.985E+01 | −8.568E+01 | −4.539E−01 | 2.151E+00 |
| 14th Coefficient (F) | −2.643E+00 | 7.662E+01 | 2.210E+02 | −2.268E+03 | −3.764E+02 | 2.727E+02 | 1.312E+01 | −1.017E+00 |
| 16th Coefficient (G) | 4.985E+00 | −1.158E+02 | −4.115E+02 | 6.001E+03 | 1.014E+03 | −6.217E+02 | −5.318E+01 | −5.514E+00 |

TABLE 12-continued

| | | | | | | | | |
|---|---|---|---|---|---|---|---|---|
| 18th Coefficient (H) | −6.180E+00 | 1.268E+02 | 5.537E+02 | −1.149E+04 | −1.965E+03 | 1.025E+03 | 1.172E+02 | 1.558E+01 |
| 20th Coefficient (J) | 5.214E+00 | −1.008E+02 | −5.400E+02 | 1.594E+04 | 2.734E+03 | −1.224E+03 | −1.644E+02 | −2.165E+01 |
| 22nd Coefficient (L) | −3.018E+00 | 5.741E+01 | 3.780E+02 | −1.583E+04 | −2.702E+03 | 1.049E+03 | 1.534E+02 | 1.884E+01 |
| 24th Coefficient (M) | 1.181E+00 | −2.284E+01 | −1.851E+02 | 1.095E+04 | 1.848E+03 | −6.279E+02 | −9.508E+01 | −1.071E+01 |
| 26th Coefficient (N) | −2.988E−01 | 6.018E+00 | 6.016E+01 | −5.016E+03 | −8.307E+02 | 2.494E+02 | 3.758E+01 | 3.891E+00 |
| 28th Coefficient (O) | 4.410E−02 | −9.431E−01 | −1.166E+01 | 1.366E+03 | 2.206E+02 | −5.903E+01 | −8.558E+00 | −8.219E−01 |
| 30th Coefficient (P) | −2.885E−03 | 6.649E−02 | 1.020E+00 | −1.672E+02 | −2.619E+01 | 6.301E+00 | 8.507E−01 | 7.706E−02 |

| Surface No. | S9 | S10 | S11 | S12 | S13 | S14 | S15 | S16 |
|---|---|---|---|---|---|---|---|---|
| Conic Coefficient (K) | −37.251 | 0.926 | 5.503 | −7.297 | −1.567 | −7.702 | −11.315 | −5.098 |
| 4th Coefficient (A) | −2.233E−01 | −2.798E−01 | −3.839E−02 | 1.908E−02 | 1.921E−02 | 5.625E−02 | −1.795E−01 | −1.165E−01 |
| 6th Coefficient (B) | 4.079E−01 | 3.470E−01 | 1.067E−01 | 1.780E−01 | 1.306E−01 | 2.230E−02 | 1.297E−01 | 8.585E−02 |
| 8th Coefficient (C) | −1.394E+00 | −8.371E−01 | −1.872E−01 | −2.201E−01 | −1.960E−01 | −3.590E−02 | −8.441E−02 | −4.894E−02 |
| 10th Coefficient (D) | 4.366E+00 | 1.785E+00 | 9.375E−02 | 1.658E−02 | 1.006E−01 | −3.748E−02 | 4.141E−02 | 2.016E−02 |
| 12th Coefficient (E) | −9.858E+00 | −2.772E+00 | 1.000E−01 | 2.086E−01 | 9.594E−03 | 8.426E−02 | −1.392E−02 | −5.937E−03 |
| 14th Coefficient (F) | 1.567E+01 | 3.109E+00 | −2.229E−01 | −2.635E−01 | −3.770E−02 | −6.678E−02 | 3.230E−03 | 1.256E−03 |
| 16th Coefficient (G) | −1.776E+01 | −2.558E+00 | 2.057E−01 | 1.796E−01 | 2.000E−02 | 3.080E−02 | −5.293E−04 | −1.923E−04 |
| 18th Coefficient (H) | 1.441E+01 | 1.567E+00 | −1.179E−01 | −8.028E−02 | −5.037E−03 | −9.307E−03 | 6.220E−05 | 2.139E−05 |
| 20th Coefficient (J) | −8.320E+00 | −7.242E−01 | 4.538E−02 | 2.481E−02 | 5.065E−04 | 1.925E−03 | −5.266E−06 | −1.724E−06 |
| 22nd Coefficient (L) | 3.336E+00 | 2.524E−01 | −1.192E−02 | −5.356E−03 | 5.463E−05 | −2.758E−04 | 3.186E−07 | 9.946E−08 |
| 24th Coefficient (M) | −8.831E−01 | −6.477E−02 | 2.107E−03 | 7.938E−04 | −2.347E−05 | 2.699E−05 | −1.344E−08 | −3.996E−09 |
| 26th Coefficient (N) | 1.390E−01 | 1.151E−02 | −2.400E−04 | −7.701E−05 | 3.083E−06 | −1.726E−06 | 3.758E−10 | 1.060E−10 |
| 28th Coefficient (O) | −9.967E−03 | −1.255E−03 | 1.592E−05 | 4.405E−06 | −1.947E−07 | 6.503E−08 | −6.258E−12 | −1.665E−12 |
| 30th Coefficient (P) | 3.589E−05 | 6.262E−05 | −4.674E−07 | −1.126E−07 | 4.985E−09 | −1.097E−09 | 4.701E−14 | 1.173E−14 |

Figure 12:
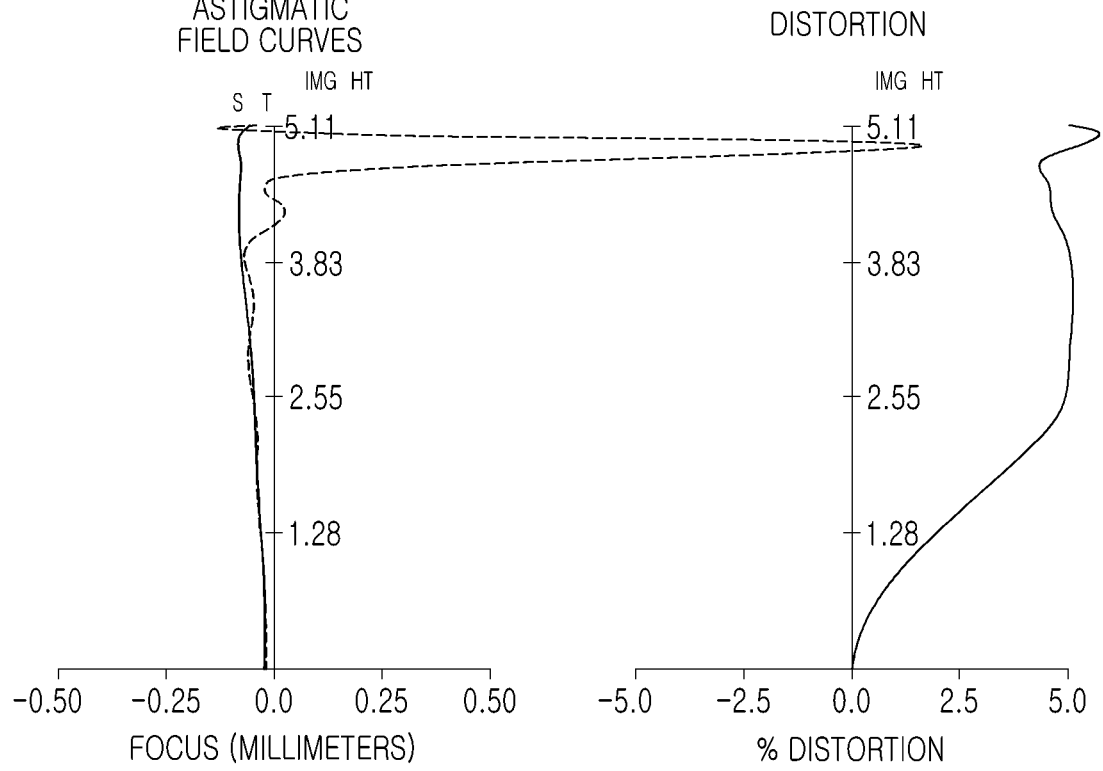
FIG. 12 is a diagram illustrating aberration properties of the example optical imaging system illustrated in FIG. 11.

The above-configured optical imaging system may have aberration properties as illustrated in FIG. 12.

Figure 13:
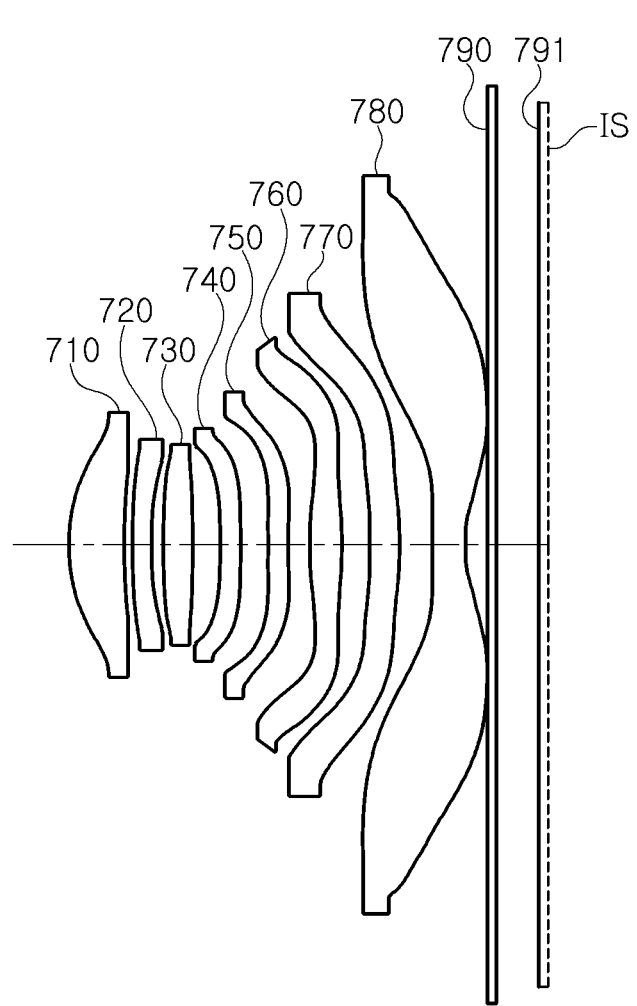
FIG. 13 is a diagram illustrating an example optical imaging system according to a seventh example embodiment.

An example optical imaging system according to a seventh example embodiment will be described with reference to FIGS. 13 and 14.

An example optical imaging system 700 in the seventh example embodiment may include an optical system including a first lens 710, a second lens 720, a third lens 730, a fourth lens 740, a fifth lens 750, a sixth lens 760, a seventh lens 770, and an eighth lens 780, and may further include a filter 790 and an image sensor IS.

The example optical imaging system 700 in the seventh example embodiment may form a focused image on an imaging plane 791. The imaging plane 791 may refer to a surface on which a focused image is formed by an optical imaging system. In an example, the imaging plane 791 may refer to one surface of the image sensor IS on which light is received.

The lens properties (a radius of curvature, a thickness of the lens or a distance between the lenses, a refractive index, an Abbe number, and a focal length) of each lens are listed in Table 13 below.

TABLE 13

| Surface No. | Note | Radius of Curvature | Thickness or Distance | Refractive Index | Abbe Number | Focal Length |
|---|---|---|---|---|---|---|
| S1 | First Lens | 1.998 | 0.651 | 1.544 | 56.0 | 5.04 |
| S2 | | 6.447 | 0.104 | | | |
| S3 | Second Lens | 9.339 | 0.210 | 1.680 | 18.2 | −13.29 |
| S4 | | 4.581 | 0.148 | | | |
| S5 | Third Lens | 7.899 | 0.338 | 1.535 | 55.7 | 11.96 |
| S6 | | −33.858 | 0.324 | | | |
| S7 | Fourth Lens | −18.821 | 0.239 | 1.635 | 24.0 | −40.93 |
| S8 | | −66.887 | 0.314 | | | |
| S9 | Fifth Lens | 6.710 | 0.237 | 1.567 | 37.4 | −26.34 |
| S10 | | 4.580 | 0.262 | | | |

TABLE 13-continued

| Surface No. | Note | Radius of Curvature | Thickness or Distance | Refractive Index | Abbe Number | Focal Length |
|---|---|---|---|---|---|---|
| S11 | Sixth Lens | 6.054 | 0.365 | 1.544 | 56.0 | 4.97 |
| S12 | | −4.815 | 0.339 | | | |
| S13 | Seventh Lens | −4.837 | 0.340 | 1.671 | 19.2 | 29.21 |
| S14 | | −3.999 | 0.377 | | | |
| S15 | Eighth Lens | 11.200 | 0.392 | 1.535 | 55.7 | −3.19 |
| S16 | | 1.467 | 0.250 | | | |
| S17 | Filter | Infinity | 0.110 | 1.517 | 64.2 | |
| S18 | | Infinity | 0.500 | | | |
| S19 | Imaging Plane | Infinity | | | | |

In the example optical imaging system 700 in the seventh example embodiment, a total focal length f may be 4.48 mm, IMG HT may be 5.107 mm, FOV may be 94°, SAG52 may be −0.5241 mm, SAG62 may be −0.768 mm, SAG72 may be −0.9193 mm, and SAG82 may be −0.8972 mm.

In the seventh example embodiment, the first lens 710 may have positive refractive power, the first surface of the first lens 710 may be convex, and the second surface of the first lens 710 may be concave.

The second lens 720 may have negative refractive power, the first surface of the second lens 720 may be convex, and the second surface of the second lens 720 may be concave.

The third lens 730 may have positive refractive power, and the first surface of the third lens 730 may be convex, and the second surface of the third lens 730 may be convex.

The fourth lens 740 may have negative refractive power, the first surface of the fourth lens 740 may be concave, and the second surface of the fourth lens 740 may be convex.

The fifth lens 750 may have negative refractive power, the first surface of the fifth lens 750 may be convex, and the second surface of the fifth lens 750 may be concave.

The sixth lens 760 may have positive refractive power, and the first surface of the sixth lens 760 may be convex in a paraxial region, and the second surface of the sixth lens 760 may be convex in a paraxial region.

At least one inflection point may be formed on at least one of the first surface and the second surface of the sixth lens 760. In an example, the first surface of the sixth lens 760 may be convex in the paraxial region and concave in a portion or region other than the paraxial region. The second surface of the sixth lens 760 may be convex in the paraxial region and concave in a portion or region other than the paraxial region.

The seventh lens 770 may have positive refractive power, and the first surface of the seventh lens 770 may be concave in the paraxial region, and the second surface of the seventh lens 770 may be convex in the paraxial region.

At least one inflection point may be formed on at least one of the first surface and the second surface of the seventh lens 770. In an example, the first surface of the seventh lens 770 may be concave in the paraxial region and convex in a portion or region other than the paraxial region. The second surface of the seventh lens 770 may be convex in the paraxial region and concave in a portion or region other than the paraxial region.

The eighth lens 780 may have negative refractive power, the first surface of the eighth lens 780 may be convex in the paraxial region, and the second surface of the eighth lens 780 may be concave in the paraxial region.

At least one inflection point may be formed on at least one of the first and second surfaces of the eighth lens 780. In an example, the first surface of the eighth lens 780 may be convex in the paraxial region and concave in a portion or region other than the paraxial region. The second surface of the eighth lens 780 may be concave in the paraxial region and convex in a portion or region other than the paraxial region.

Each surface of the first lens 710 to the eighth lens 780 may have an aspherical coefficient, as illustrated in Table 14 below. In an example, both the object-side surfaces and the image-side surfaces of the first lens 710 to the eighth lens 780 may be aspherical.

TABLE 14

| Surface No. | S1 | S2 | S3 | S4 | S5 | S6 | S7 | S8 |
|---|---|---|---|---|---|---|---|---|
| Conic Coefficient (K) | −2.215 | −40.612 | 24.842 | 12.560 | 17.082 | −99.000 | −97.805 | −99.000 |
| 4th Coefficient (A) | 2.601E−02 | −3.699E−02 | −6.124E−02 | 6.568E−03 | −1.602E−02 | −2.990E−02 | −8.440E−02 | −8.331E−02 |
| 6th Coefficient (B) | 3.016E−02 | 2.726E−01 | 3.889E−01 | −6.557E−01 | −2.782E−02 | 1.782E−01 | −4.124E−02 | −1.896E−04 |
| 8th Coefficient (C) | −2.152E−01 | −1.816E+00 | −2.893E+00 | 7.902E+00 | 5.755E−01 | −1.985E+00 | 8.076E−01 | 1.410E−01 |
| 10th Coefficient (D) | 7.429E−01 | 7.755E+00 | 1.511E+01 | −5.984E+01 | −5.322E+00 | 1.448E+01 | −7.021E+00 | −3.619E−01 |
| 12th Coefficient (E) | −1.513E+00 | −2.243E+01 | −5.235E+01 | 3.149E+02 | 3.156E+01 | −7.162E+01 | 3.549E+01 | −7.709E−01 |
| 14th Coefficient (F) | 1.733E+00 | 4.563E+01 | 1.241E+02 | −1.182E+03 | −1.271E+02 | 2.456E+02 | −1.205E+02 | 6.416E+00 |
| 16th Coefficient (G) | −7.372E−01 | −6.687E+01 | −2.058E+02 | 3.207E+03 | 3.579E+02 | −5.952E+02 | 2.886E+02 | −1.806E+01 |
| 18th Coefficient (H) | −8.225E−01 | 7.141E+01 | 2.407E+02 | −6.311E+03 | −7.166E+02 | 1.032E+03 | −4.972E+02 | 3.046E+01 |
| 20th Coefficient (J) | 1.609E+00 | −5.557E+01 | −1.972E+02 | 8.988E+03 | 1.023E+03 | −1.285E+03 | 6.184E+02 | −3.426E+01 |

TABLE 14-continued

| | | | | | | | | |
|---|---|---|---|---|---|---|---|---|
| 22nd Coefficient (L) | −1.290E+00 | 3.115E+01 | 1.103E+02 | −9.149E+03 | −1.034E+03 | 1.139E+03 | −5.503E+02 | 2.646E+01 |
| 24th Coefficient (M) | 6.056E−01 | −1.223E+01 | −3.971E+01 | 6.480E+03 | 7.203E+02 | −7.003E+02 | 3.413E+02 | −1.393E+01 |
| 26th Coefficient (N) | −1.723E−01 | 3.189E+00 | 8.018E+00 | −3.031E+03 | −3.291E+02 | 2.840E+02 | −1.401E+02 | 4.790E+00 |
| 28th Coefficient (O) | 2.762E−02 | −4.956E−01 | −5.554E−01 | 8.413E+02 | 8.859E+01 | −6.829E+01 | 3.417E+01 | −9.719E−01 |
| 30th Coefficient (P) | −1.921E−03 | 3.471E−02 | −4.361E−02 | −1.049E+02 | −1.064E+01 | 7.371E+00 | −3.749E+00 | 8.837E−02 |

| Surface No. | S9 | S10 | S11 | S12 | S13 | S14 | S15 | S16 |
|---|---|---|---|---|---|---|---|---|
| Conic Coefficient (K) | −37.817 | 1.058 | 5.567 | −7.720 | −1.490 | −8.356 | −13.727 | −5.348 |
| 4th Coefficient (A) | −1.998E−01 | −2.623E−01 | −1.604E−02 | 5.409E−02 | 1.981E−02 | 5.251E−02 | −1.954E−01 | −1.216E−01 |
| 6th Coefficient (B) | 2.386E−01 | 2.855E−01 | 5.798E−02 | 6.313E−02 | 1.197E−01 | 2.385E−02 | 1.814E−01 | 1.054E−01 |
| 8th Coefficient (C) | −4.638E−01 | −7.661E−01 | −1.023E−01 | 1.223E−01 | −1.783E−01 | −1.967E−02 | −1.540E−01 | −7.136E−02 |
| 10th Coefficient (D) | 6.297E−01 | 1.839E+00 | −5.804E−02 | −6.576E−01 | 1.168E−01 | −6.399E−02 | 8.846E−02 | 3.343E−02 |
| 12th Coefficient (E) | 6.659E−01 | −3.164E+00 | 2.630E−01 | 1.032E+00 | −6.139E−02 | 1.010E−01 | −3.293E−02 | −1.082E−02 |
| 14th Coefficient (F) | −5.088E+00 | 3.955E+00 | −3.039E−01 | −9.219E−01 | 4.830E−02 | −7.080E−02 | 8.272E−03 | 2.459E−03 |
| 16th Coefficient (G) | 1.129E+01 | −3.667E+00 | 2.008E−01 | 5.419E−01 | −3.750E−02 | 3.008E−02 | −1.453E−03 | −3.985E−04 |
| 18th Coefficient (H) | −1.472E+01 | 2.544E+00 | −8.699E−02 | −2.214E−01 | 1.937E−02 | −8.509E−03 | 1.823E−04 | 4.643E−05 |
| 20th Coefficient (J) | 1.265E+01 | −1.320E+00 | 2.565E−02 | 6.419E−02 | −6.425E−03 | 1.663E−03 | −1.646E−05 | −3.893E−06 |
| 22nd Coefficient (L) | −7.396E+00 | 5.053E−01 | −5.132E−03 | −1.318E−02 | 1.392E−03 | −2.267E−04 | 1.061E−06 | 2.325E−07 |
| 24th Coefficient (M) | 2.925E+00 | −1.381E−01 | 6.727E−04 | 1.877E−03 | −1.969E−04 | 2.121E−05 | −4.775E−08 | −9.643E−09 |
| 26th Coefficient (N) | −7.504E−01 | 2.535E−02 | −5.349E−05 | −1.763E−04 | 1.757E−05 | −1.302E−06 | 1.424E−09 | 2.636E−10 |
| 28th Coefficient (O) | 1.129E−01 | −2.788E−03 | 2.175E−06 | 9.818E−06 | −8.989E−07 | 4.731E−08 | −2.533E−11 | −4.271E−12 |
| 30th Coefficient (P) | −7.560E−03 | 1.382E−04 | −2.716E−08 | −2.454E−07 | 2.014E−08 | −7.718E−10 | 2.033E−13 | 3.104E−14 |

Figure 14:
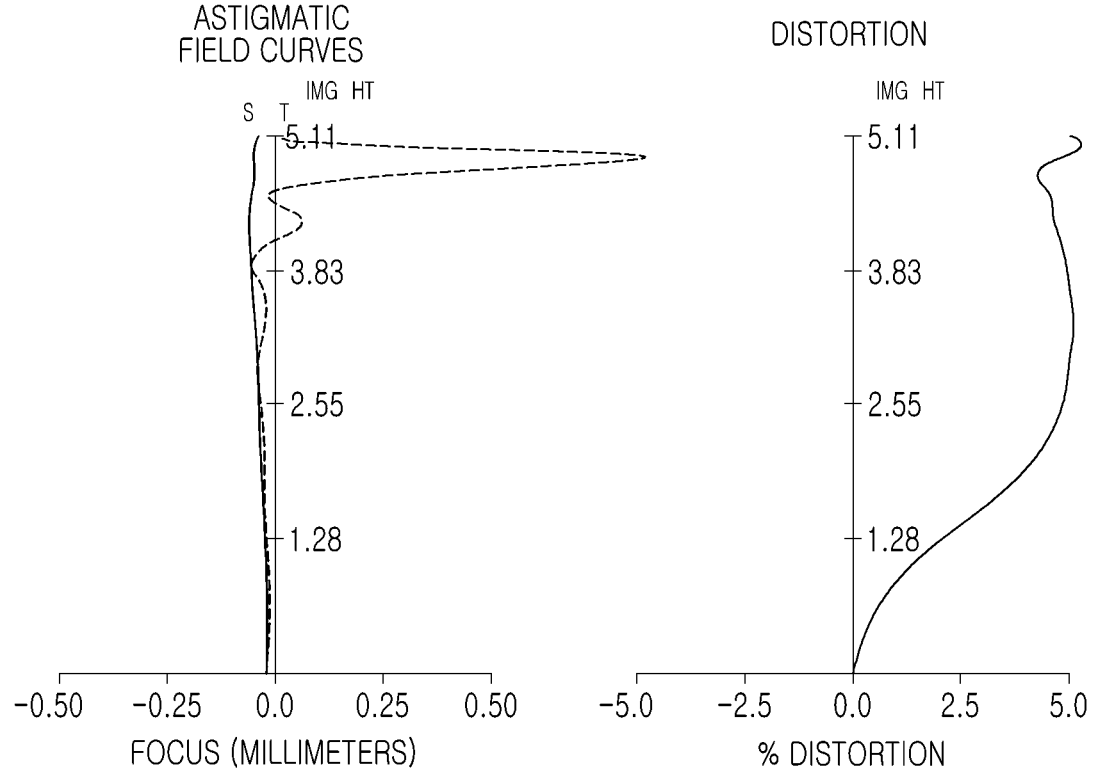
FIG. 14 is a diagram illustrating aberration properties of the example optical imaging system illustrated in FIG. 13.

The above-configured optical imaging system may have aberration properties illustrated in FIG. 14.

Figure 15:
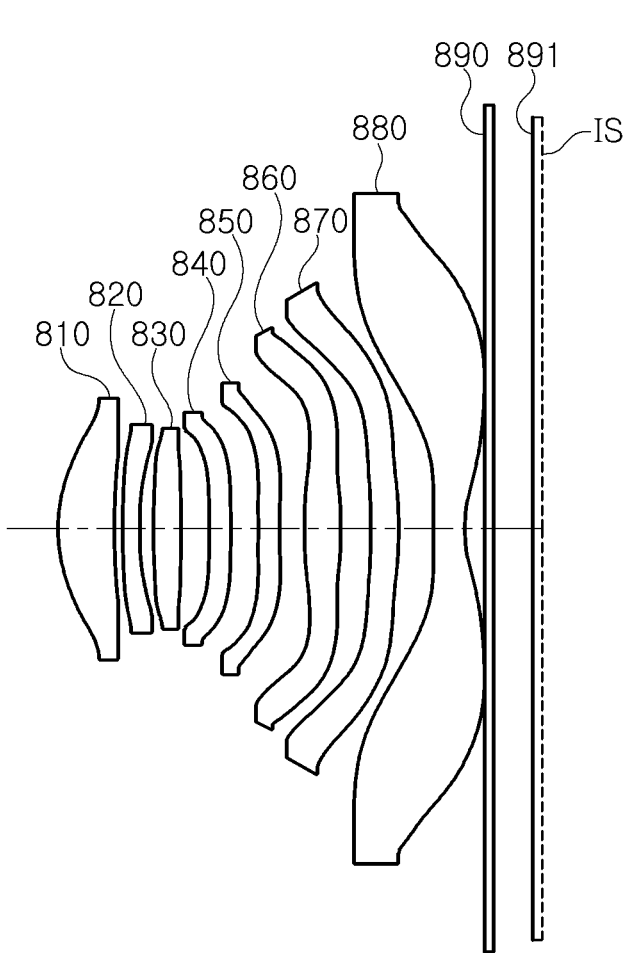
FIG. 15 is a diagram illustrating an example optical imaging system according to an eighth example embodiment.

An example optical imaging system according to an eighth example embodiment will be described with reference to FIGS. 15 and 16.

An example optical imaging system 800 in the eighth example embodiment may include an optical system including a first lens 810, a second lens 820, a third lens 830, a fourth lens 840, a fifth lens 850, a sixth lens 860, a seventh lens 870, and an eighth lens 880, and may further include a filter 890 and an image sensor IS.

The example optical imaging system 800 in the eighth example embodiment may form a focused image on an imaging plane 891. The imaging plane 891 may refer to a surface on which a focused image is formed by an optical imaging system. In an example, the imaging plane 891 may refer to one surface of the image sensor IS on which light is received.

The lens properties (a radius of curvature, a thickness of the lens or a distance between the lenses, a refractive index, an Abbe number, and a focal length) of each lens are listed in Table 15 below.

TABLE 15

| Surface No. | Note | Radius of Curvature | Thickness or Distance | Refractive Index | Abbe Number | Focal Length |
|---|---|---|---|---|---|---|
| S1 | First Lens | 2.179 | 0.710 | 1.544 | 56.0 | 5.5 |
| S2 | | 7.069 | 0.116 | | | |
| S3 | Second Lens | 9.893 | 0.210 | 1.680 | 18.2 | −14.2 |
| S4 | | 4.879 | 0.164 | | | |
| S5 | Third Lens | 7.977 | 0.353 | 1.535 | 55.7 | 13.2 |
| S6 | | −62.034 | 0.362 | | | |
| S7 | Fourth Lens | −15.622 | 0.269 | 1.635 | 24.0 | −56.6 |
| S8 | | −27.636 | 0.341 | | | |
| S9 | Fifth Lens | 7.932 | 0.271 | 1.567 | 37.4 | −26.2 |
| S10 | | 5.116 | 0.316 | | | |
| S11 | Sixth Lens | 6.570 | 0.465 | 1.544 | 56.0 | 5.1 |
| S12 | | −4.683 | 0.385 | | | |
| S13 | Seventh Lens | −5.047 | 0.340 | 1.671 | 19.2 | 83.6 |
| S14 | | −4.761 | 0.429 | | | |

TABLE 15-continued

| Surface No. | Note | Radius of Curvature | Thickness or Distance | Refractive Index | Abbe Number | Focal Length |
|---|---|---|---|---|---|---|
| S15 | Eighth Lens | 15.082 | 0.409 | 1.535 | 55.7 | -3.6 |
| S16 | | 1.678 | 0.250 | | | |
| S17 | Filter | Infinity | 0.110 | 1.517 | 64.2 | |
| S18 | | Infinity | 0.500 | | | |
| S19 | Imaging Plane | Infinity | | | | |

In the example optical imaging system 800 according to the eighth example embodiment, a total focal length f may be 4.85 mm, IMG HT may be 5.107 mm, FOV may be 91.2°, SAG52 may be −0.5223 mm, SAG62 may be −0.8633 mm, SAG72 may be −1.0326 mm, and SAG82 may be −0.844 mm.

In the eighth example embodiment, the first lens 810 may have positive refractive power, the first surface of the first lens 810 may be convex, and the second surface of the first lens 810 may be concave.

The second lens 820 may have negative refractive power, the first surface of the second lens 820 may be convex, and the second surface of the second lens 820 may be concave.

The third lens 830 may have positive refractive power, and the first surface of the third lens 830 may be convex, and the second surface of the third lens 830 may be convex.

The fourth lens 840 may have negative refractive power, the first surface of the fourth lens 840 may be concave, and the second surface of the fourth lens 840 may be convex.

The fifth lens 850 may have negative refractive power, the first surface of the fifth lens 850 may be convex, and the second surface of the fifth lens 850 may be concave.

The sixth lens 860 may have positive refractive power, and the first surface of the sixth lens 860 may be convex in a paraxial region, and the second surface of the sixth lens 860 may be convex in a paraxial region.

At least one inflection point may be formed on at least one of the first surface and the second surface of the sixth lens 860. In an example, the first surface of the sixth lens 860 may be convex in the paraxial region and concave in a portion or region other than the paraxial region. The second surface of the sixth lens 860 may be convex in the paraxial region and concave in a portion or region other than the paraxial region.

The seventh lens 870 may have positive refractive power, the first surface of the seventh lens 870 may be concave in the paraxial region, and the second surface of the seventh lens 870 may be convex in the paraxial region.

At least one inflection point may be formed on at least one of the first surface and the second surface of the seventh lens 870. In an example, the first surface of the seventh lens 870 may be concave in the paraxial region and convex in a portion or region other than the paraxial region. The second surface of the seventh lens 870 may be convex in the paraxial region and concave in a portion or region other than the paraxial region.

The eighth lens 880 may have negative refractive power, the first surface of the eighth lens 880 may be convex in the paraxial region, and the second surface of the eighth lens 880 may be concave in the paraxial region.

At least one inflection point may be formed on at least one of the first and second surfaces of the eighth lens 880. In an example, the first surface of the eighth lens 880 may be convex in the paraxial region and concave in a portion or region other than the paraxial region. The second surface of the eighth lens 880 may be concave in the paraxial region and convex in a portion or region other than the paraxial region.

Each surface of the first lens 810 to the eighth lens 880 may have an aspherical coefficient, as illustrated in Table 16 below. In an example, both the object-side surfaces and the image-side surfaces of the first lens 810 to the eighth lens 880 may be aspherical.

TABLE 16

| Surface No. | S1 | S2 | S3 | S4 | S5 | S6 | S7 | S8 |
|---|---|---|---|---|---|---|---|---|
| Conic Coefficient (K) | -2.216 | -39.745 | 28.141 | 12.469 | 13.913 | 99.000 | -61.266 | -89.578 |
| 4th Coefficient (A) | 2.356E-02 | -3.438E-02 | -5.140E-02 | 1.307E-02 | -3.161E-03 | -1.869E-02 | -7.069E-02 | 7.082E-02 |
| 6th Coefficient (B) | -1.593E-02 | 2.755E-01 | 3.410E-01 | -5.666E-01 | -2.331E-01 | 2.480E-02 | 5.311E-02 | 3.409E-02 |
| 8th Coefficient (C) | 8.413E-02 | -1.679E+00 | -2.229E+00 | 5.809E+00 | 2.569E+00 | -2.452E-01 | -2.851E-01 | 3.056E-02 |
| 10th Coefficient (D) | -3.255E-01 | 6.487E+00 | 9.881E+00 | -3.761E+01 | -1.701E+01 | 1.812E+00 | 9.565E-01 | -3.842E-01 |
| 12th Coefficient(E) | 8.226E-01 | -1.699E+01 | -2.931E+01 | 1.668E+02 | 7.381E+01 | -9.390E+00 | -2.347E+00 | 1.071E+00 |
| 14th Coefficient(F) | -1.444E+00 | 3.130E+01 | 6.015E+01 | -5.217E+02 | -2.197E+02 | 3.260E+01 | 3.482E+00 | -1.744E+00 |
| 16th Coefficient (G) | 1.799E+00 | -4.152E+01 | -8.728E+01 | 1.169E+03 | 4.615E+02 | -7.702E+01 | -1.538E+00 | 1.822E+00 |
| 18th Coefficient (H) | -1.610E+00 | 4.005E+01 | 9.032E+01 | -1.893E+03 | -6.943E+02 | 1.265E+02 | -5.082E+00 | -1.178E+00 |
| 20th Coefficient (J) | 1.035E+00 | -2.810E+01 | -6.637E+01 | 2.214E+03 | 7.510E+02 | -1.462E+02 | 1.254E+01 | 3.483E-01 |
| 22nd Coefficient (L) | -4.730E-01 | 1.417E+01 | 3.393E+01 | -1.850E+03 | -5.787E+02 | 1.185E+02 | -1.452E+01 | 1.134E-01 |

TABLE 16-continued

| | | | | | | | | |
|---|---|---|---|---|---|---|---|---|
| 24th Coefficient (M) | 1.496E−01 | −5.002E+00 | −1.155E+01 | 1.075E+03 | 3.098E+02 | −6.605E+01 | 1.012E+01 | −1.666E−01 |
| 26th Coefficient (N) | −3.112E−02 | 1.171E+00 | 2.399E+00 | −4.128E+02 | −1.094E+02 | 2.410E+01 | −4.325E+00 | 7.689E−02 |
| 28th Coefficient (O) | 3.823E−03 | −1.634E−01 | −2.485E−01 | 9.402E+01 | 2.293E+01 | −5.189E+00 | 1.050E+00 | −1.762E−02 |
| 30th Coefficient (P) | −2.101E−04 | 1.027E−02 | 6.176E−03 | −9.618E+00 | −2.157E+00 | 4.997E−01 | −1.112E−01 | 1.680E−03 |

| Surface No. | S9 | S10 | S11 | S12 | S13 | S14 | S15 | S16 |
|---|---|---|---|---|---|---|---|---|
| Conic Coefficient (K) | −42.121 | 1.382 | 5.345 | −5.740 | −0.998 | −6.128 | −37.598 | −5.640 |
| 4th Coefficient (A) | −1.614E−01 | −1.994E−01 | −1.484E−02 | 4.741E−02 | 3.770E−02 | 5.046E−02 | −1.226E−01 | −6.731E−02 |
| 6th Coefficient (B) | 1.692E−01 | 1.503E−01 | 4.356E−02 | 6.367E−02 | 7.763E−02 | 3.167E−02 | 5.670E−02 | 2.899E−02 |
| 8th Coefficient (C) | −3.296E−01 | −2.299E−01 | −1.322E−01 | −1.088E−01 | −1.589E−01 | −8.274E−02 | −2.829E−02 | −1.076E−02 |
| 10th Coefficient (D) | 8.983E−01 | 4.534E−01 | 2.090E−01 | 7.068E−02 | 1.415E−01 | 6.344E−02 | 1.193E−02 | 3.514E−03 |
| 12th Coefficient (E) | −1.966E+00 | −7.633E−01 | −2.521E−01 | −3.113E−02 | −8.236E−02 | −2.672E−02 | −3.443E−03 | −9.637E−04 |
| 14th Coefficient (F) | 2.971E+00 | 9.489E−01 | 2.255E−01 | 1.647E−02 | 3.570E−02 | 6.644E−03 | 6.754E−04 | 2.034E−04 |
| 16th Coefficient (G) | −3.107E+00 | −8.457E−01 | −1.435E−01 | −1.057E−02 | −1.226E−02 | −8.827E−04 | −9.277E−05 | −3.146E−05 |
| 18th Coefficient (H) | 2.273E+00 | 5.385E−01 | 6.419E−02 | 5.222E−03 | 3.337E−03 | 1.189E−05 | 9.123E−06 | 3.505E−06 |
| 20th Coefficient (J) | −1.164E+00 | −2.449E−01 | −2.013E−02 | −1.725E−03 | −6.949E−04 | 1.804E−05 | −6.481E−07 | −2.796E−07 |
| 22nd Coefficient (L) | 4.116E−01 | 7.899E−02 | 4.393E−03 | 3.784E−04 | 1.059E−04 | −3.546E−06 | 3.309E−08 | 1.580E−08 |
| 24th Coefficient (M) | −9.665E−02 | −1.766E−02 | −6.533E−04 | −5.475E−05 | −1.128E−05 | 3.559E−07 | −1.188E−09 | −6.172E−10 |
| 26th Coefficient (N) | 1.394E−02 | 2.605E−03 | 6.308E−05 | 5.040E−06 | 7.895E−07 | −2.104E−08 | 2.852E−11 | 1.584E−11 |
| 28th Coefficient (O) | −1.042E−03 | −2.281E−04 | −3.563E−06 | −2.682E−07 | −3.250E−08 | 6.984E−10 | −4.121E−13 | −2.401E−13 |
| 30th Coefficient (P) | 2.430E−05 | 8.991E−06 | 8.932E−08 | 6.290E−09 | 5.954E−10 | −1.012E−11 | 2.715E−15 | 1.629E−15 |

Figure 16:
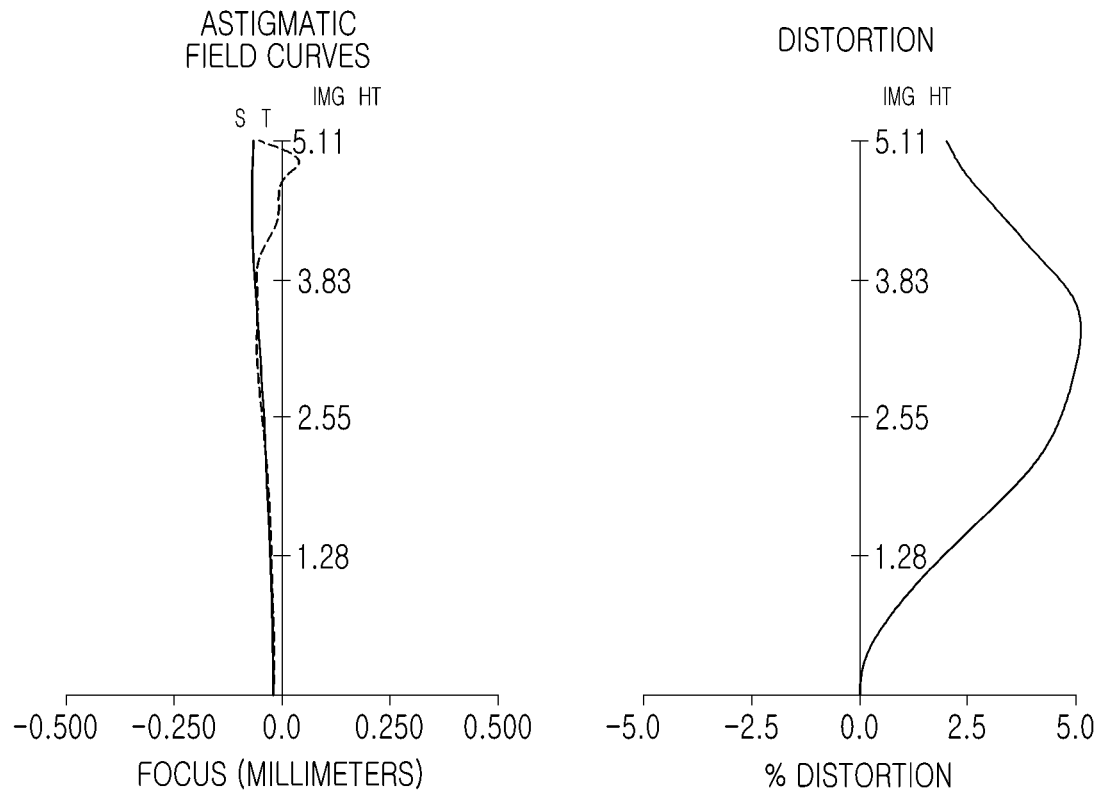
FIG. 16 is a diagram illustrating aberration properties of the example optical imaging system illustrated in FIG. 15.

The above-configured optical imaging system may have aberration properties illustrated in FIG. 16.

Figure 17:
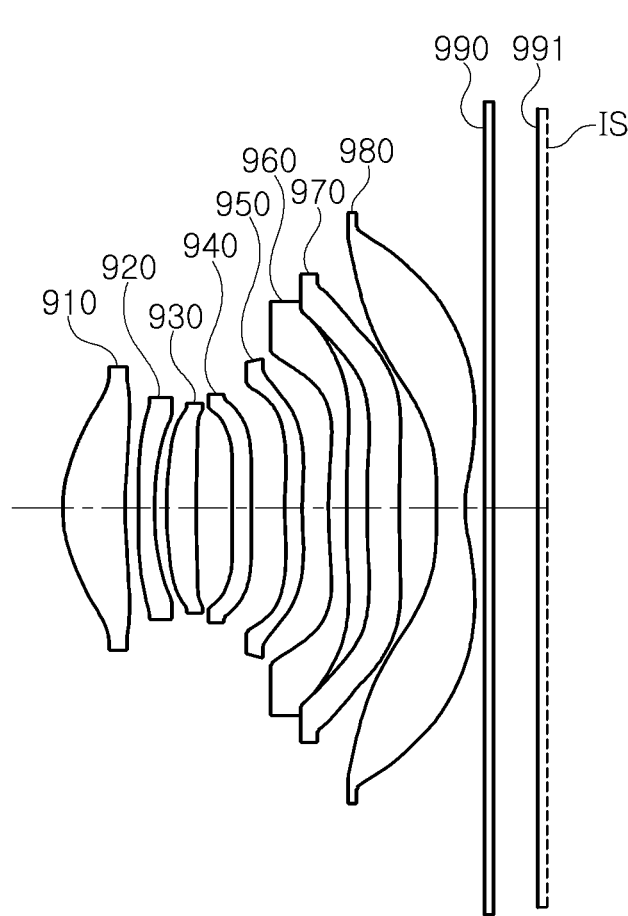
FIG. 17 is a diagram illustrating an example optical imaging system according to a ninth example embodiment.

An example optical imaging system according to a ninth example embodiment will be described with reference to FIGS. 17 and 18.

An example optical imaging system 900 in the ninth example embodiment may include an optical system including a first lens 910, a second lens 920, a third lens 930, a fourth lens 940, a fifth lens 950, a sixth lens 960, a seventh lens 970, and an eighth lens 980, and may further include a filter 990 and an image sensor IS.

The example optical imaging system 900 in the ninth example embodiment may form a focused image on an imaging plane 991. The imaging plane 991 may refer to a surface on which a focused image is formed by an optical imaging system. In an example, the imaging plane 991 may refer to one surface of the image sensor IS on which light is received.

The lens properties (a radius of curvature, a thickness of the lens or a distance between the lenses, a refractive index, an Abbe number, and a focal length) of each lens are listed in Table 17 below.

TABLE 17

| Surface No. | Note | Radius of Curvature | Thickness or Distance | Refractive Index | Abbe Number | Focal Length |
|---|---|---|---|---|---|---|
| S1 | First Lens | 2.153 | 0.784 | 1.544 | 56.0 | 5.28 |
| S2 | | 7.384 | 0.160 | | | |
| S3 | Second Lens | 10.074 | 0.210 | 1.680 | 18.2 | −12.63 |
| S4 | | 4.629 | 0.149 | | | |
| S5 | Third Lens | 5.454 | 0.378 | 1.535 | 55.7 | 13.56 |
| S6 | | 21.207 | 0.451 | | | |
| S7 | Fourth Lens | 21.821 | 0.235 | 1.635 | 24.0 | −178.19 |
| S8 | | 18.244 | 0.423 | | | |
| S9 | Fifth Lens | 7.039 | 0.220 | 1.567 | 37.4 | −52.3 |
| S10 | | 5.631 | 0.332 | | | |
| S11 | Sixth Lens | 8.422 | 0.234 | 1.544 | 56.0 | 7.64 |
| S12 | | −8.191 | 0.256 | | | |
| S13 | Seventh Lens | −9.296 | 0.404 | 1.671 | 19.2 | 169.22 |
| S14 | | −8.751 | 0.460 | | | |
| S15 | Eighth Lens | 15.974 | 0.360 | 1.535 | 55.7 | −3.23 |
| S16 | | 1.555 | 0.250 | | | |

TABLE 17-continued

| Surface No. | Note | Radius of Curvature | Thickness or Distance | Refractive Index | Abbe Number | Focal Length |
|---|---|---|---|---|---|---|
| S17 | Filter | Infinity | 0.110 | 1.517 | 64.2 | |
| S18 | | Infinity | 0.555 | | | |
| S19 | Imaging Plane | Infinity | | | | |

In the example optical imaging system 900 according to the ninth embodiment, a total focal length f may be 5.45 mm, IMG HT may be 5.107 mm, FOV may be 83°, SAG52 may be −0.4981 mm, SAG62 may be −0.5886 mm, SAG72 may be −1.0419 mm, and SAG82 may be −1.37 mm.

In the ninth example embodiment, the first lens 910 may have positive refractive power, the first surface of the first lens 910 may be convex, and the second surface of the first lens 910 may be concave.

The second lens 920 may have negative refractive power, the first surface of the second lens 920 may be convex, and the second surface of the second lens 920 may be concave.

The third lens 930 may have positive refractive power, the first surface of the third lens 930 may be convex, and the second surface of the third lens 930 may be concave.

The fourth lens 940 may have negative refractive power, the first surface of the fourth lens 940 may be convex, and the second surface of the fourth lens 940 may be concave.

The fifth lens 950 may have negative refractive power, the first surface of the fifth lens 950 may be convex, and the second surface of the fifth lens 950 may be concave.

The sixth lens 960 may have positive refractive power, and the first surface of the sixth lens 960 may be convex in a paraxial region, and the second surface of the sixth lens 960 may be convex in a paraxial region.

At least one inflection point may be formed on at least one of the first surface and the second surface of the sixth lens 960. In an example, the first surface of the sixth lens 960 may be convex in the paraxial region and concave in a portion or region other than the paraxial region. The second surface of the sixth lens 960 may be convex in the paraxial region and concave in a portion or region other than the paraxial region.

The seventh lens 970 may have positive refractive power, the first surface of the seventh lens 970 may be concave in the paraxial region, and the second surface of the seventh lens 970 may be convex in the paraxial region.

At least one inflection point may be formed on at least one of the first surface and the second surface of the seventh lens 970. In an example, the first surface of the seventh lens 970 may be concave in the paraxial region and convex in a portion or region other than the paraxial region. The second surface of the seventh lens 970 may be convex in the paraxial region and concave in a portion or region other than the paraxial region.

The eighth lens 980 may have negative refractive power, the first surface of the eighth lens 980 may be convex in the paraxial region, and the second surface of the eighth lens 980 may be concave in the paraxial region.

At least one inflection point may be formed on at least one of the first and second surfaces of the eighth lens 980. In an example, the first surface of the eighth lens 980 may be convex in the paraxial region and concave in a portion or region other than the paraxial region. The second surface of the eighth lens 980 may be concave in the paraxial region and convex in a portion or region other than the paraxial region.

Each surface of the first lens 910 to the eighth lens 980 may have an aspherical coefficient, as illustrated in Table 18 below. In an example, both the object-side surfaces and the image-side surfaces of the first lens 910 to the eighth lens 980 may be aspherical.

TABLE 18

| Surface No. | S1 | S2 | S3 | S4 | S5 | S6 | S7 | S8 |
|---|---|---|---|---|---|---|---|---|
| Conic Coefficient (K) | −2.167 | −43.628 | 34.383 | 12.266 | 10.421 | 83.655 | −83.980 | −71.576 |
| 4th Coefficient (A) | 2.263E−02 | −2.546E−02 | −2.723E−02 | 2.616E−03 | −4.598E−03 | −2.432E−02 | −9.781E−02 | −9.899E−02 |
| 6th Coefficient (B) | −2.546E−02 | 1.407E−01 | 6.140E−03 | −6.401E−01 | −3.351E−01 | 6.677E−02 | 4.426E−01 | 4.056E−01 |
| 8th Coefficient (C) | 1.318E−01 | −6.734E−01 | 3.914E−01 | 7.147E+00 | 3.007E+00 | −4.781E−01 | −3.708E+00 | −2.645E+00 |
| 10th Coefficient (D) | −4.416E−01 | 2.034E+00 | −2.200E+00 | −4.535E+01 | −1.638E+01 | 2.521E+00 | 1.954E+01 | 1.102E+01 |
| 12th Coefficient (E) | 9.322E−01 | −4.143E+00 | 7.048E+00 | 1.881E+02 | 5.979E+01 | −9.469E+00 | −6.936E+01 | −3.097E+01 |
| 14th Coefficient (F) | −1.328E+00 | 5.889E+00 | −1.488E+01 | −5.366E+02 | −1.516E+02 | 2.520E+01 | 1.712E+02 | 6.060E+01 |
| 16th Coefficient (G) | 1.322E+00 | −5.976E+00 | 2.164E+01 | 1.082E+03 | 2.729E+02 | −4.760E+01 | −3.011E+02 | −8.450E+01 |
| 18th Coefficient (H) | −9.356E−01 | 4.380E+00 | −2.211E+01 | −1.563E+03 | −3.526E+02 | 6.436E+01 | 3.820E+02 | 8.509E+01 |
| 20th Coefficient (J) | 4.735E−01 | −2.321E+00 | 1.595E+01 | 1.626E+03 | 3.276E+02 | −6.250E+01 | −3.504E+02 | −6.205E+01 |
| 22nd Coefficient (L) | −1.699E−01 | 8.795E−01 | −8.052E+00 | −1.205E+03 | −2.166E+02 | 4.331E+01 | 2.303E+02 | 3.247E+01 |
| 24th Coefficient (M) | 4.222E−02 | −2.322E−01 | 2.771E+00 | 6.209E+02 | 9.941E+01 | −2.095E+01 | −1.057E+02 | −1.189E+01 |
| 26th Coefficient (N) | −6.897E−03 | 4.053E−02 | −6.158E−01 | −2.113E+02 | −3.006E+01 | 6.735E+00 | 3.219E+01 | 2.895E+00 |

TABLE 18-continued

| | | | | | | | |
|---|---|---|---|---|---|---|---|
| 28th Coefficient (O) | 6.664E−04 | −4.199E−03 | 7.915E−02 | 4.271E+01 | 5.384E+00 | −1.295E+00 | −5.840E+00 | −4.212E−01 |
| 30th Coefficient (P) | −2.884E−05 | 1.955E−04 | −4.422E−03 | −3.879E+00 | −4.322E−01 | 1.128E−01 | 4.779E−01 | 2.774E−02 |

| Surface No. | S9 | S10 | S11 | S12 | S13 | S14 | S15 | S16 |
|---|---|---|---|---|---|---|---|---|
| Conic Coefficient (K) | −21.206 | 2.563 | −3.682 | −10.018 | −0.154 | 0.237 | 1.195 | −11.354 |
| 4th Coefficient (A) | −1.820E−01 | −2.570E−01 | −7190E−02 | 1.226E−01 | 2.795E−01 | 2.344E−01 | −2.879E−01 | −1.599E−01 |
| 6th Coefficient (B) | 4.373E−01 | 4.964E−01 | 1.587E−01 | −6.878E−02 | −4.467E−01 | −3.074E−01 | 3.225E−01 | 1.575E−01 |
| 8th Coefficient (C) | −1.382E+00 | −1.126E+00 | −3.295E−02 | 6.140E−02 | 4.404E−01 | 2.312E−01 | −2.682E−01 | −1.198E−01 |
| 10th Coefficient (D) | 3.522E+00 | 1.948E+00 | −4.899E−01 | −1.396E−01 | −3.613E−01 | −1.415E−01 | 1.479E−01 | 6.669E−02 |
| 12th Coefficient (E) | −6.756E+00 | −2.535E+00 | 1.035E+00 | 1.669E−01 | 2.596E−01 | 7.948E−02 | −5.454E−02 | −2.664E−02 |
| 14th Coefficient (F) | 9.566E+00 | 2.488E+00 | −1.196E+00 | −1.140E−01 | −1.488E−01 | −3.737E−02 | 1.397E−02 | 7.602E−03 |
| 16th Coefficient (G) | −9.940E+00 | −1.817E+00 | 9.354E−01 | 4.986E−02 | 6.284E−02 | 1.315E−02 | −2.559E−03 | −1.555E−03 |
| 18th Coefficient (H) | 7.547E+00 | 9.693E−01 | −5.208E−01 | −1.479E−02 | −1.896E−02 | −3.308E−03 | 3.404E−04 | 2.290E−04 |
| 20th Coefficient (J) | −4.159E+00 | −3.698E−01 | 2.080E−01 | 3.039E−03 | 4.049E−03 | 5.874E−04 | −3.302E−05 | −2.423E−05 |
| 22nd Coefficient (L) | 1.639E+00 | 9.816E−02 | −5.890E−02 | −4.323E−04 | −6.049E−04 | −7.287E−05 | 2.313E−06 | 1.822E−06 |
| 24th Coefficient (M) | −4.489E−01 | −1.735E−02 | 1.151E−02 | 4.151E−05 | 6.159E−05 | 6.175E−06 | −1.140E−07 | −9.498E−08 |
| 26th Coefficient (N) | 8.095E−02 | 1.885E−03 | −1.473E−03 | −2.543E−06 | −4.054E−06 | −3.404E−07 | 3.753E−09 | 3.257E−09 |
| 28th Coefficient (O) | −8.621E−03 | −1.062E−04 | 1.108E−04 | 8.808E−08 | 1.545E−07 | 1.100E−08 | −7.407E−11 | −6.604E−11 |
| 30th Coefficient (P) | 4.096E−04 | 1.901E−06 | −3.715E−06 | −1.269E−09 | −2.566E−09 | −1.580E−10 | 6.628E−13 | 5.992E−13 |

Figure 18:
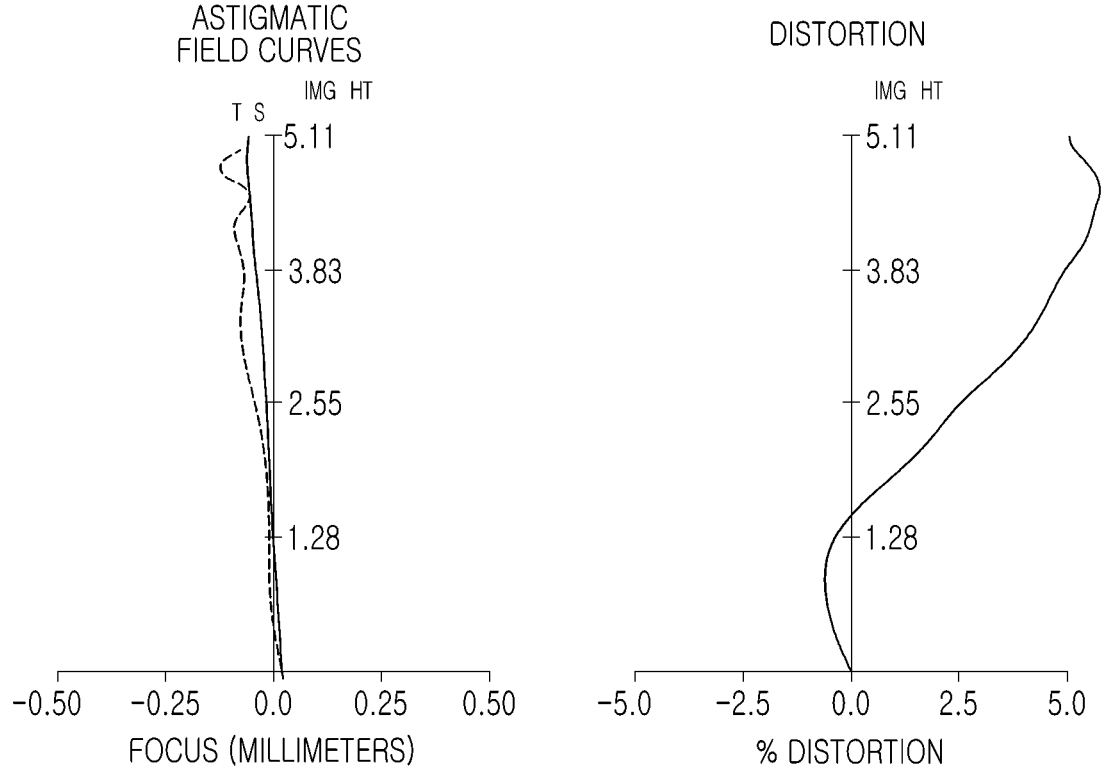
FIG. 18 is a diagram illustrating aberration properties of the example optical imaging system illustrated in FIG. 17.

The above-configured optical imaging system may have aberration properties illustrated in FIG. 18.

As described above, an example optical imaging system according to example embodiments may have a reduced size while implementing high resolution.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens, a second lens, a third lens, a fourth lens, a fifth lens, a sixth lens, a seventh lens, and an eighth lens disposed in order from an object side to an imaging side, wherein:
the first lens is configured to have positive refractive power, and the second lens is configured to have negative refractive power;
the third lens is configured to have positive refractive power, and the fourth lens is configured to have positive refractive power;
the sixth lens is configured to have negative refractive power and a concave image-side surface in a paraxial region thereof;
the seventh lens is configured to have positive refractive power, a convex object-side surface in a paraxial region thereof, and a convex image-side surface in the paraxial region thereof; and
TTL/(2×IMG HT)<0.6, −0.2<SAG52/TTL<0, and 10<v1−(v6+v7)/2<30 are satisfied,
where TTL is a distance from an object-side surface of the first lens to an imaging plane on an optical axis, IMG HT is equal to half a diagonal length of the imaging plane, SAG52 is a SAG value at an end of an effective aperture of an image-side surface of the fifth lens, v1 is an Abbe number of the first lens, v6 is an Abbe number of the sixth lens, and v7 is an Abbe number of the seventh lens.

2. The optical imaging system of claim 1, wherein:
at least one of −0.2<SAG62/TTL<0, −0.3<SAG72/TTL<0, and −0.3<SAG82/TTL<0 is satisfied,
where SAG62 is a SAG value at an end of an effective aperture of an image-side surface of the sixth lens, SAG72 is a SAG value at an end of an effective aperture of an image-side surface of the seventh lens, and SAG82 is a SAG value at an end of an effective aperture of an image-side surface of the eighth lens.

3. The optical imaging system of claim 1, wherein:
at least one of 25<v1−v2<45 and 20<v1−v4<45 is satisfied, where v1 is an Abbe number of the first lens, v2 is an Abbe number of the second lens, and v4 is an Abbe number of the fourth lens.

4. The optical imaging system of claim 1, wherein: $0 < f1/f < 1.4$ is satisfied, where f is a total focal length of the optical imaging system, and f1 is a focal length of the first lens.

5. The optical imaging system of claim 1, wherein: $-5 < f2/f < -1$ is satisfied, where f is a total focal length of the optical imaging system, and f2 is a focal length of the second lens.

6. The optical imaging system of claim 1, wherein: $1 < f3/f < 7$ is satisfied, where f is a total focal length of the optical imaging system, and f3 is a focal length of the third lens.

7. The optical imaging system of claim 1, wherein: $0.3 < |f4/f|/10 < 15$ is satisfied, where f is a total focal length of the optical imaging system, and f4 is a focal length of the fourth lens.

8. The optical imaging system of claim 1, wherein: $0.2 < |f5/f|/10 < 5$ is satisfied, where f is a total focal length of the optical imaging system, and f5 is a focal length of the fifth lens.

9. The optical imaging system of claim 1, wherein: $0.5 < |f6/f| < 7$ is satisfied, where f is a total focal length of the optical imaging system, and f6 is a focal length of the sixth lens.

10. The optical imaging system of claim 1, wherein: $0 < (f7/f)/10 < 5$ is satisfied, where f is a total focal length of the optical imaging system, and f7 is a focal length of the seventh lens.

11. The optical imaging system of claim 1, wherein: $-3 < f8/f < 0$ is satisfied, where f is a total focal length of the optical imaging system, and f8 is a focal length of the eighth lens.

12. The optical imaging system of claim 1, wherein: $TTL/f < 1.4$ and $BFL/f < 0.3$ are satisfied, where f is a total focal length of the optical imaging system, and BFL is a distance from an image-side surface of the eighth lens to the imaging plane on the optical axis.

13. The optical imaging system of claim 1, wherein: $D1/f < 0.1$ is satisfied, where D1 is a distance between an image-side surface of the first lens and an object-side surface of the second lens on the optical axis.

14. The optical imaging system of claim 1, wherein: $FOV \times (IMG\ HT/f) > 65°$ is satisfied, where f is a total focal length of the optical imaging system, and FOV is a field of view of the optical imaging system.

15. The optical imaging system of claim 1, wherein: the fifth lens has negative refractive power, and the eighth lens has negative refractive power.

* * * * *